United States Patent
Lee et al.

(10) Patent No.: US 11,836,038 B2
(45) Date of Patent: *Dec. 5, 2023

(54) METHOD AND APPARATUS FOR MANAGING OPERATION DATA OF APPLIANCE FOR FAILURE PREDICTION

(71) Applicant: SAMSUNG ELECTRONICS CO., LTD., Suwon-si (KR)

(72) Inventors: Jae-Hun Lee, Seongnam-si (KR); Myung-Sun Kim, Seongnam-si (KR); Ayush Jain, Seoul (KR); Tae-Ho Hwang, Seoul (KR); Jae-Hong Kim, Yongin-si (KR); Hye-Jung Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 44 days.

This patent is subject to a terminal disclaimer.

(21) Appl. No.: 17/532,575

(22) Filed: Nov. 22, 2021

(65) Prior Publication Data

US 2022/0083409 A1 Mar. 17, 2022

Related U.S. Application Data

(63) Continuation of application No. 16/047,160, filed on Jul. 27, 2018, now Pat. No. 11,182,235.

(30) Foreign Application Priority Data

Dec. 26, 2017 (KR) .................... 10-2017-0179226

(51) Int. Cl.
  *G06F 11/07* (2006.01)
(52) U.S. Cl.
  CPC ........ *G06F 11/079* (2013.01); *G06F 11/0709* (2013.01); *G06F 11/0727* (2013.01); *G06F 11/0751* (2013.01); *G06F 11/0778* (2013.01)

(58) Field of Classification Search
  USPC .......................................................... 700/21
  See application file for complete search history.

(56) References Cited

U.S. PATENT DOCUMENTS

| 6,738,811 B1 | 5/2004 | Liang |
| 6,807,430 B2 | 10/2004 | Woods et al. |

(Continued)

FOREIGN PATENT DOCUMENTS

| CN | 103543698 A | 1/2014 |
| CN | 105302120 A | 2/2016 |

(Continued)

OTHER PUBLICATIONS

Communication dated Oct. 14, 2020 issued by the European Intellectual Property Office in counterpart European Application No. 18897726.8.

(Continued)

*Primary Examiner* — Md Azad
(74) *Attorney, Agent, or Firm* — Sughrue Mion, PLLC

(57) ABSTRACT

A method performed by a managing server includes: receiving, from an electronic device, operation data of the electronic device; identifying, by using artificial intelligence (AI), a device usage pattern of the electronic device; identifying, by using the AI, information related to a failure or an abnormal operation of the electronic device and a solution to the failure or the abnormal operation based on the device usage pattern and the operation data received from the electronic device; and transmitting, to a user terminal, the information related to the failure or the abnormal operation of the electronic device and the solution to the failure or the abnormal operation.

18 Claims, 12 Drawing Sheets

(56) References Cited

U.S. PATENT DOCUMENTS

| | | |
|---|---|---|
| 7,827,447 B2 | 11/2010 | Eberbach et al. |
| 8,599,008 B2 | 12/2013 | Watson et al. |
| 9,154,516 B1 | 10/2015 | Vaystikh et al. |
| 2003/0120972 A1 | 6/2003 | Matsushima et al. |
| 2008/0168242 A1 | 7/2008 | Eberbach et al. |
| 2008/0320326 A1 | 12/2008 | Akiyama et al. |
| 2011/0054844 A1 | 3/2011 | Han et al. |
| 2014/0009300 A1 | 1/2014 | Ha et al. |
| 2015/0346706 A1* | 12/2015 | Gendelman .......... G05B 19/058 700/79 |
| 2016/0092848 A1 | 3/2016 | Nakajima et al. |
| 2016/0127144 A1* | 5/2016 | Takahashi .......... G06Q 30/0641 705/27.1 |
| 2016/0274161 A1* | 9/2016 | Jeon ....................... G01R 21/00 |
| 2016/0321125 A1 | 11/2016 | Kang et al. |
| 2016/0370023 A1 | 12/2016 | Stewart et al. |
| 2017/0063997 A1 | 3/2017 | Zhu et al. |
| 2017/0078111 A1* | 3/2017 | Bryce ................. H04L 12/2818 |
| 2018/0364135 A1* | 12/2018 | Eriksson ............. G01M 99/005 |
| 2019/0050752 A1* | 2/2019 | Kang ..................... G06F 16/00 |

FOREIGN PATENT DOCUMENTS

| | | |
|---|---|---|
| CN | 107491021 A | 12/2017 |
| JP | 2013-061840 A | 4/2013 |
| JP | 2016-071871 A | 5/2016 |
| JP | 2017-045257 A | 3/2017 |
| KR | 10-2002-0006815 A | 1/2002 |
| KR | 10-2014-0007178 A | 1/2014 |
| KR | 10-2016-0018758 A | 2/2016 |

OTHER PUBLICATIONS

Search Report dated Dec. 7, 2018, issued by the International Searching Authority in counterpart International Patent Application No. PCT/KR2018/009922 (PCT/ISA/210).

Written Opinion dated Dec. 7, 2018, issued by the International Searching Authority in counterpart International Patent Application No. PCT/KR2018/009922 (PCT/ISA/237)

Office Action dated Apr. 17, 2020 issued by the United States Patent and Trademark Office in U.S. Appl. No. 16/047,160.

Office Action dated Sep. 21, 2020 issued by the United States Patent and Trademark Office in U.S. Appl. No. 16/047,160.

Office Action dated Feb. 22, 2021 issued by the United States Patent and Trademark Office in U.S. Appl. No. 16/047,160.

Notice of Allowance dated Jul. 23, 2021 issued by the United States Patent and Trademark Office in U.S. Appl. No. 16/047,160.

Communication dated Dec. 26, 2022 by the Korean Intellectual Property Office in Korean Patent Application No. 10-2017-0179226.

Communication dated May 27, 2023 from the China National Intellectual Property Administration in CN Application No. 201811006102.9.

Communication dated Jul. 4, 2023 from the Korean Patent Office in KR Application No. 10-2017- 0179226.

\* cited by examiner

METHOD AND APPARATUS FOR MANAGING OPERATION DATA OF APPLIANCE FOR FAILURE PREDICTION

CROSS-REFERENCE TO RELATED APPLICATION(S)

This is a continuation of U.S. application Ser. No. 16/047,160, filed on Jul. 27, 2018, which is based on and claims priority under 35 U.S.C. § 119 to Korean Patent Application No. 10-2017-0179226, filed on Dec. 26, 2017, in the Korean Intellectual Property Office, the disclosures of which are incorporated by reference herein in their entireties.

BACKGROUND

1. Field

The disclosure relates to methods and apparatuses for managing operation data of appliances for failure prediction and, particularly, to artificial intelligence (AI) systems that may mimic the human brain's capabilities of perception or determination using machine learning algorithms and their applications.

2. Description of Related Art

The Internet is evolving from a human-centered connection network where information is produced and consumed to an Internet-of-Things (IoT) network where information is communicated and processed among distributed components. The Internet of Everything (IoE) technology may be an example of a combination of the big data processing technology and the IoT technology, for example, through a connection with a cloud server.

Implementing the IoT requires technical elements, such as sensing technology, a wired/wireless communication and network infrastructure, service interface and security technologies. A recent ongoing research for thing-to-thing connection is on techniques for sensor networking, machine-to-machine (M2M), or machine-type communication (MTC).

In the IoT environment may be offered intelligent Internet Technology (IT) services that collect and analyze the data generated by the things connected with one another to create human life a new value. The IoT may have various applications, such as the smart home, smart building, smart city, smart car or connected car, smart grid, healthcare, or smart appliance industry, or state-of-art medical services, through conversion or integration of existing IT technologies and various industries.

Home network system is a system that enables control of home appliances by wire or wirelessly linking the home appliances. Advanced home network systems offer various Internet-related services by connecting home appliances to an external public data network, e.g., the Internet protocol (IP) network (i.e., the Internet), directly or via home gateways or customer premises equipment (CPE). Advanced home network systems may also enable users to directly or indirectly control and manage appliances while interworking with the users' terminals. Such home network system may offer services desired by users by controlling the home appliances according to the users' request.

In developing home appliances used in home network systems, the manufacturers put significant efforts on quality warranty and customer services. Current quality warranty systems predict a failure in the home appliance before it occurs, allowing for a cost-effective operation and enhanced reliability. Manufacturers offer home visit services for automated failure diagnosis and repair, contributing to cost savings and more satisfaction.

With the recent technology development and diversified user demand, there is a need to efficiently support failure prediction for home appliances to deliver a diversity of failure prediction-based services.

Human intelligence-class AI systems are being utilized in various industry sectors. The AI systems learn on their own and get smarter unlike existing rule-based smart systems. The more used, the more precisely AI systems may perceive and understand users' preference. Thus, legacy rule-based smart systems are being gradually replaced with deep learning-based AI systems.

AI technology consists of machine learning (e.g., deep learning) and machine learning-based component technology.

Machine learning is an algorithm technique that may classify and learn the features of input data itself. The component technology is a technique for mimicking the human brain's perception and decision capabilities using a machine learning algorithm (e.g., deep learning).

The following are examples of AI applications. Linguistic understanding is technology for recognizing and applying/processing a human being's language or text, and this encompasses natural language processing, machine translation, dialog system, answering inquiries, and speech recognition/synthesis. Visual understanding is a technique of perceiving and processing things as do human eyes, and this encompasses object recognition, object tracing, image search, human recognition, scene recognition, space understanding, and image enhancement. Inference prediction is a technique of determining and logically inferring and predicting information, encompassing knowledge/probability-based inference, optimization prediction, preference-based planning, and recommendation. Knowledge expression is a technique of automatically processing human experience information, covering knowledge buildup (data production/classification) and knowledge management (data utilization). Operation control is a technique of controlling the motion of robots and driverless car driving, and this encompasses movement control (navigation, collision, driving) and maneuvering control (behavior control).

The above information is presented as background information only to assist with an understanding of the disclosure. No determination has been made, and no assertion is made, as to whether any of the above might be applicable as prior art with regard to the disclosure.

SUMMARY

In accordance with an aspect of the disclosure, there may be provided a method and apparatus for selectively transmitting appliance operation data to a managing server for failure prediction.

In accordance with an aspect of the disclosure, there may be provided a method and apparatus for enabling efficient transmission of operation data gathered from appliances.

In accordance with an aspect of the disclosure, there may be provided a method and apparatus for classifying operation data gathered from appliances into normal and abnormal data.

In accordance with an aspect of the disclosure, there may be provided a method and apparatus for providing a diagnosis treatment solution for diagnosing and treating a failure that is predicted or occurs in an appliance.

In accordance with an aspect of the disclosure, there may be provided a method and apparatus for optimizing a diagnosis treatment solution for a failure in an appliance depending on the user's profile and appliance settings.

In accordance with an aspect of the disclosure, a method by an appliance configured to manage operation data for failure prediction includes receiving, from a managing server, information about a data pattern detection routine to detect abnormal data among operation data of the appliance, determining whether the operation data of the appliance matches a normal data pattern defined by the data pattern detection routine, when the operation data does not match the normal data pattern, determining the operation data as the abnormal data, and transmitting the determined abnormal data to the managing server.

In accordance with an aspect of the disclosure, a method by a managing server configured to receive operation data for predicting a failure in an appliance includes transmitting, to the appliance, information about a data pattern detection routine to detect abnormal data among operation data of the appliance, receiving, from the appliance, abnormal data that does not match a normal data pattern defined by the data pattern detection routine, receiving a failure history, a failure repair history, a customer profile, an operation history, and information indicating an installation environment for the appliance from a customer service (CS) server configured to manage a CS for the appliance, generating a customized diagnosis treatment solution configured to address a failure occurring in the appliance by reflecting the failure history, the failure repair history, the customer profile, the operation history, and the installation environment for the appliance based on the received information, and transmitting information about the customized diagnosis treatment solution to the appliance.

In accordance with an aspect of the disclosure, an apparatus of an appliance configured to manage operation data for failure prediction includes a native function executing unit, a communication unit configured to receive, from a managing server, information about a data pattern detection routine to detect abnormal data among operation data of the native function executing unit and to transmit abnormal data determined based on the information about the data pattern detection routine to the managing server, and a controller configured to determine whether the operation data of the native function executing unit matches a normal data pattern defined by the data pattern detection routine and to, when the operation data does not match the normal data pattern, determine the operation data as the abnormal data.

In accordance with an aspect of the disclosure, an apparatus of a managing server configured to receive operation data for predicting a failure in an appliance includes a communication unit configured to transmit, to the appliance, information about a data pattern detection routine to detect abnormal data among operation data of the appliance, receive, from the appliance, abnormal data that does not match a normal data pattern defined by the data pattern detection routine, receive a failure history, a failure repair history, a customer profile, an operation history, and information indicating an installation environment for the appliance from a customer service (CS) server configured to manage a CS for the appliance, and transmit, to the appliance, information about a customized diagnosis treatment solution generated based on the received information and a controller configured to generate the customized diagnosis treatment solution configured to address a failure occurring in the appliance by reflecting the failure history, the failure repair history, the customer profile, the operation history, and the installation environment for the appliance based on the received information.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

The above and/or other aspects will become more apparent by describing certain embodiments with reference to the accompanying drawings, in which.

Throughout the drawings, like reference numerals will be understood to refer to like parts, components, and structures.

DETAILED DESCRIPTION

Figure 1:
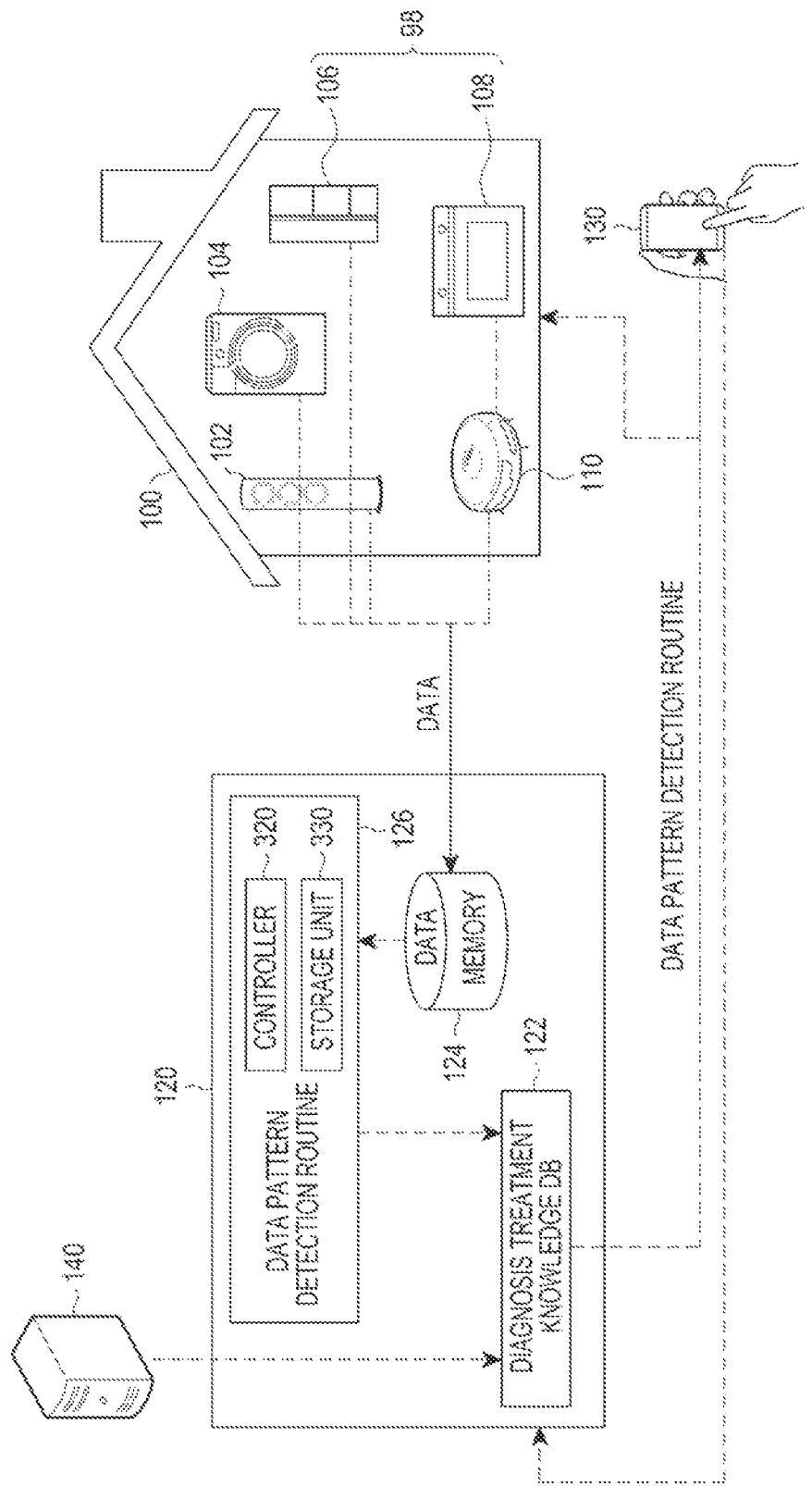
FIG. 1 is a view schematically illustrating a system for managing an appliance based on failure prediction according to an embodiment.

Hereinafter, embodiments of the disclosure are described in detail with reference to the accompanying drawings.

In describing the embodiments, the description of technologies that are known in the art and are not directly related to the disclosure is omitted. This is for further clarifying the gist of the disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions. Since the computer program instructions may be provided in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be provided in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented as one or more of central processing units (CPUs) in a device or a security multimedia card.

Although the description of embodiments herein mentions various particular systems and signal standards, the subject matter of the disclosure may also be applicable to other systems or services having similar technical backgrounds without departing from the scope of the disclosure, and this may be determined by one of ordinary skill in the art.

According to an embodiment, user terminal may be an electronic device provided with communication feature. The user terminal may provide a user interface (UI) to the user of the user terminal and may communicate through with at least one server over an external network and at least one appliance over a home network directly or via at least one network node (e.g., a home gateway, CPE, or router). The electronic device may be, e.g., a portable electronic device or wearable electronic device, mountable electronic device.

The portable electronic device may include, but is not limited to, at least one of, e.g., a smartphone, a feature phone, a tablet PC, a laptop computer, a video phone, an electronic book reader, a portable digital assistant (PDA), a portable media player (PMP), an MP3 player, a mobile medical device, an electronic dictionary, an electronic key, a camcorder, or a camera.

The wearable electronic device may include, but is not limited to, at least one of an accessory-type device (e.g., a watch, a ring, a bracelet, an anklet, a necklace, glasses, contact lenses, or a head-mounted device (HMD)), a fabric- or clothes-integrated device (e.g., electronic clothes or exercise clothing), a body attaching-type device (e.g., a skin pad or tattoo), or a body implantable device (e.g., an implantable circuit).

According to embodiments of the disclosure, the electronic device may be one or a combination of the above-listed devices. According to an embodiment, the electronic device may be a flexible electronic device. The electronic device disclosed herein is not limited to the above-listed devices and may include new electronic devices depending on the development of technology.

Various terms as used herein may be defined as follows.

Appliance refers to smart appliances and electronic devices that may be installed in homes or offices and are provided with the Internet access feature.

Managing server refers to a server that may be operated by the appliance manufacturer or manager and may communicate with a user terminal and/or at least one appliance. The managing server may include a diagnosis treatment knowledge database (DB) that may be used to gather and manage operation data and manage appliances based on the gathered operation data.

Diagnosis treatment knowledge DB is a database that stores information used to predict, diagnose, and treat a failure in various appliances. As an example, the diagnosis treatment knowledge DB may store at least one or more of operation data, failure history, failure repair history, manufacture information, environment information indicating the environment (mean temperature, mean humidity, or installation height) where the appliance is installed, and customer profile information. The diagnosis treatment knowledge DB may further store at least one diagnosis treatment solution that may be used to repair or address a failure predicted or caused.

Operation data refers to data related to the operation of the appliance. The operation data may include various data items such as sensor data gathered from at least one sensor in the appliance and an operation history.

Operation history refers to data that records operations based on the actual use of the appliance. The operation history may include at least one of operation time, operation mode, operation period, operation count, and operation parameter. Operation parameter refers to information for operation in each operation mode, e.g., a set temperature for an air conditioner, a load, dehydration level and dry level set for a washer, or a defrost cycle for a refrigerator.

Normal data refers to, e.g., operation parameters and/or sensor data generated as the appliance normally works among the operation data gathered in the appliance. The normal data may be defined as having at least one normal data pattern previously determined by the managing server. The normal data may be classified by at least one normal data pattern and the time of production, size, and type of the normal data.

Abnormal data refers to, e.g., operation parameters and/or sensor data generated as the appliance abnormally works (e.g., an abnormal event and/or failure) among the operation data gathered in the appliance. The abnormal data may be defined as having an abnormal data pattern previously determined by the managing server or not corresponding to at least one normal data pattern previously determined by the managing server. The abnormal data may include at least one data item which may be classified into numeric, binary, nominal, and ordinal data and a combination thereof depending on the type of the data. The abnormal data may further include at least one among the time of generation of the abnormal data, appliance identifier information for identifying the appliance, and a degree of risk related to the abnormal data.

Data pattern detection routine defines methods used to detect abnormal data and/or normal data in the appliance. As an example, the data pattern detection routine may contain information about at least one pre-defined normal data pattern and/or at least one pre-defined abnormal data pattern.

Diagnosis treatment solution includes diagnosis items and treatment items that may be used to address (repair or treat) a failure predicted or caused for the appliance. The diagnosis treatment solution may include information used to diagnose and fix a particular failure.

Customized diagnosis treatment solution refers to a diagnosis treatment solution optimized for the user given at least one of environment information, operation data, customer profile, and failure history and failure repair history about the same or similar types of appliances. The customized diagnosis treatment solution may be generated based on a diagnosis treatment solution searched from a knowledge DB. The diagnosis treatment solution searched from the diagnosis treatment knowledge DB may be referred to as a global diagnosis treatment solution to be distinguished from the customized diagnosis treatment solution.

Described below are techniques for enabling efficient data transmission for predicting, in advance, a failure in an appliance according to embodiments of the disclosure.

Also, there is provided a method and apparatus for implementing and updating a data pattern detection routine used to detect abnormal data that needs to be transmitted from the appliance to the managing server, according to an embodiment.

Also, there is provided a method and apparatus for providing a customized diagnosis treatment solution using data gathered from the appliance according to an embodiment.

As used herein, the term "user" may denote a human or another device (e.g., an artificial intelligent electronic device) using the electronic device.

FIG. 1 is a view schematically illustrating a system for managing an appliance based on failure prediction according to an embodiment.

Referring to FIG. 1, a home system or a household system 100 includes one or more appliances 98, i.e., appliance apparatuses, including at least one among appliances 102, 104, 106, 108, and 110. At least one of the appliances 102, 104, 106, 108, and 110 may be a smart appliance having an Internet access feature and may communicate with one or more user terminals 130 and/or a managing server 120 using a wired communication or a wireless communication, such as wireless-fidelity (Wi-Fi), Zigbee, Bluetooth, near-field communication (NFC), or Z-wave. At least one of appliances 102, 104, 106, 108, and 110 may communicate with the managing server 120 directly or via the user terminal 130, a home gateway, or a CPE. The examples of the appliances 102, 104, 106, 108, and 110 include a refrigerator, a washer, an air conditioner, an oven, a robot cleaner, a television, an air circulator, an air purifier, and a dehumidifier. The appliances 98 may include a smart appliance that is not shown or mentioned herein.

The appliances 102, 104, 106, 108, and 110 may be configured to receive control commands from the user terminal 130 or the managing server 120, operated based on the control commands, and transmit requested information and/or operation data to the user terminal 130 or the managing server 120. As an example, the appliances 102, 104, 106, 108, and 110 may classify operation data generated by internal components into normal data or abnormal data depending on information about data pattern detection routine received from the managing server 120 and may transmit the abnormal data to the managing server 120 immediately when the abnormal data occurs while selectively transmitting the normal data to the managing server 120 as appropriate.

The managing server 120 includes a diagnosis treatment knowledge DB 122 for storing various data that may be used to manage the appliances 102, 104, 106, 108, and 110, a data memory 124 for receiving and/or storing abnormal data and/or normal data gathered from the appliances 102, 104, 106, 108, and 110, and a data pattern detection routine unit 126. The data pattern detection routine unit 126 may include a computing means such as a controller 320, e.g., a processor, for analyzing data received from the appliances 98 and a storage unit 330, e.g., a memory, for storing the pattern of the normal data and/or the abnormal data. According to an embodiment, the managing server 120 may store and manage information related to a home visit repair service for the appliances 102, 104, 106, 108, and 110, a failure history, and/or failure repair history in the diagnosis treatment knowledge DB 122. Additionally or alternatively, one or more customer service (CS) servers 140, which are separate network entities for gathering, storing, and managing the information related to the home visit repair service for the appliances 102, 104, 106, 108, and 110 and the failure history and failure repair history information may be configured to communicate with the managing server 120. In other words, the managing server 120 may be implemented with one or more logical and/or physical entities. The managing server 120 may manage at least one user terminal 130 that is registered in association with the appliances 102, 104, 106, 108, and 110 and may communicate the information related to the appliances 102, 104, 106, 108, and 110 to the registered user terminal 130.

The managing server 120 may store the operation data of the appliances 102, 104, 106, 108, and 110 which are received periodically or at request, in the data memory 124. The managing server 120 may analyze the pattern of abnormal data gathered from the appliances 102, 104, 106, 108, and 110 and store an abnormal data pattern generated as a result of the analysis in the data pattern detection routine unit 126. The managing server 120 may further store a normal data pattern for the appliances 102, 104, 106, 108, and 110 in the data pattern detection routine unit 126. Information about the data pattern detection routine unit 126 may be transmitted by the managing server 120 to the appliances 102, 104, 106, 108, and 110 or to the user terminal 130 associated with the appliances 102, 104, 106, 108, and 110.

The user terminal 130 may be configured to communicate with one or more appliances 102, 104, 106, 108, and 110 directly or via a home gateway or CPE, to receive information about the data pattern detection routine for at least one of the appliances 102, 104, 106, 108, and 110 from the managing server 120, and to transfer the received information about the data pattern detection routine to the corresponding appliance. According to an embodiment, the user terminal 130 may be configured to gather operation data from the relevant appliances 102, 104, 106, 108, and 110, classify the gathered operation data into normal data and abnormal data according to the data pattern detection routine, and according to a result of the classification, immediately deliver the abnormal data to the managing server 120 while delivering the normal data to the managing server 120 when appropriate.

Figure 2:
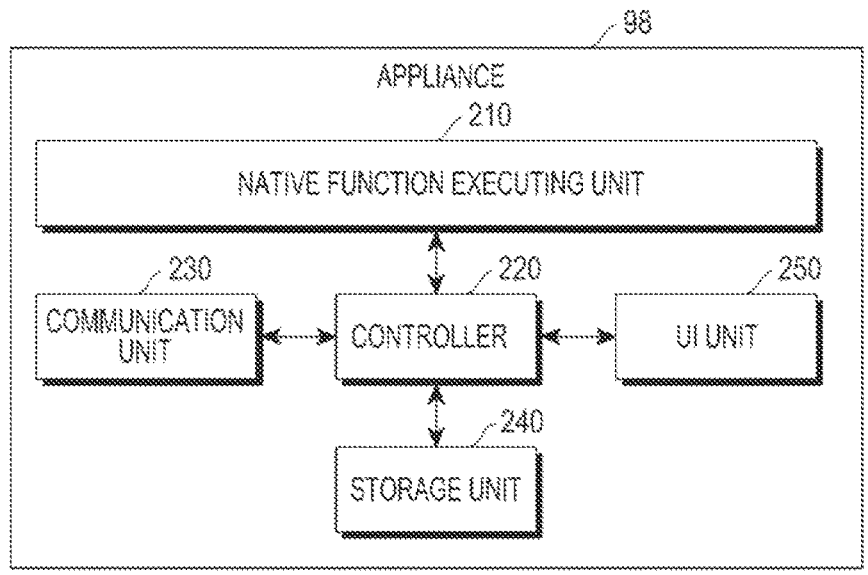
FIG. 2 is a block diagram schematically illustrating an appliance according to an embodiment.

FIG. 2 is a block diagram schematically illustrating an appliance controllable based on failure prediction according to an embodiment. The appliance may be configured with at least one or more of the components shown.

Referring to FIG. 2, the appliance may include a native function executing unit 210, e.g., an appliance function executing apparatus, a controller 220, e.g., a processor and/or a microprocessor, a communication unit 230, a storage unit 240, and a UI unit 250.

The native function executing unit 210 includes software and hardware components for executing the native functions, e.g., equipment functions, of the appliance including, for example, a motor, motor drive controls, and/or an electronic control board. As an example, where the appliance is an air conditioner, the native function executing unit 210 may include a fan, a compressor, a condenser, an evaporator, an expansion valve, and/or sensors (e.g., data gathering means). As another example, where the appliance is a washer, the native function executing unit 210 may include a door, a light, a power source, a tub, speed changer, a motor, a pump, a heater, a temperature adjuster, and various sensors (e.g., data gathering means). As another example, where the appliance is a refrigerator, the native function executing unit 210 may include a door, a light, a power source, a fan, an evaporator, a condenser, a compressor, a defrost circuit (a defrost sensor, a defrost heater, or a defrost timer), and various sensors (e.g., data gathering means). The native function executing unit 210 may receive control values for operation parameters to operate the components from the controller 220 and may operate each component using the operation parameters.

The controller 220 may gather operation data of the native function executing unit 210, classify the gathered operation data into normal data and abnormal data according to information about the data pattern detection routine received from the managing server, and transmit the classified normal data or abnormal data through the communication unit 310 to the managing server and/or user terminal or store the normal data or abnormal data in the storage unit 240. The operation data may include at least one of sensor data gathered from at least one sensor of the native function executing unit 210 and an operation history of the native function executing unit 210. The operation history may mean data recording the operation of the native function executing unit 210 and may include at least one of operation times, operation modes, operation cycles, and operation counts. The controller 220 may receive a signal for requesting additional data from the managing server, and in response to the request signal, may transmit operation data pre-stored in the storage unit 240 through the communication unit 230 to the managing server and/or the user terminal.

The communication unit 230 includes a communication interface that supports the controller 220 to be able to communicate with the user terminal and/or the managing server over the Internet. As an example, the communication unit 230 may include a wired communication module and/or a wireless communication module that supports at least one of Wi-Fi, Zigbee, Bluetooth, NFC, and Z-wave and may access the managing server and/or user terminal directly or via a home gateway or CPE.

The storage unit 240 may include a read-only memory (ROM) storing a control program to operate the appliance and a random-access memory (RAM) that stores signals or data input from the outside of the appliance or is used as a storage area for tasks performed on the appliance. As an example, the storage unit 240 may include a memory that stores operation data related to the appliance, particularly, sensor data and operation history gathered through the actual operation of the native function executing unit 210. As an example, the storage unit 240 may store, in the memory, the most recent in time data that is generated within a predetermined period among the operation data generated from the native function executing unit 210. As an example, the storage unit 240 may store, in the memory, recent normal data that is generated within a predetermined period among the operation data generated from the native function executing unit 210.

The UI unit 250 may provide information (e.g., control commands or home visit repair service schedule) delivered from the controller 220 to the user or may receive a user input and deliver it to the controller 220. The UI unit 250 may include a display, a touchscreen, at least one physical button, at least one light emitting diode (LED), a microphone, and/or a speaker.

Figure 3:
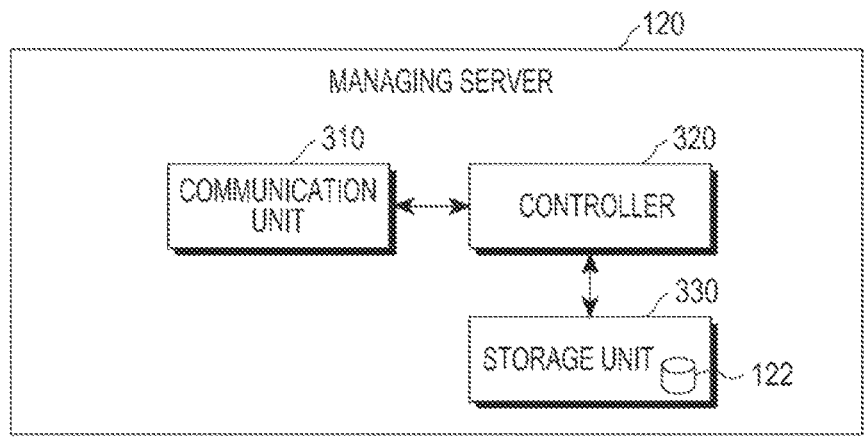
FIG. 3 is a block diagram schematically illustrating a configuration of a managing server according to an embodiment.

FIG. 3 is a block diagram schematically illustrating a configuration of a managing server configured to manage an appliance based on failure prediction according to an embodiment. The managing server may be configured with at least one or more of the components shown.

Referring to FIG. 3, the managing server may include a communication unit 310, a controller 320, e.g., a processor and/or a microprocessor, and a storage unit 330. The controller 320 and/or the storage unit 330 may be incorporated into the data pattern detection routine unit 126 or may be separate components.

The communication unit 310 includes a communication interface that supports the controller 320 to be able to communicate through the Internet with at least one appliance, user terminal, and/or at least one network entity. The network entity may be, e.g., a CS server that manages the customer service (CS) for the appliance.

The controller 320 stores, in the storage unit 330, operation data of at least one appliance that is received through the communication unit 310. Upon receipt of the abnormal data of the appliance through the communication unit 310, the controller 320 may analyze the abnormal data based on at least one existing abnormal data pattern stored in the storage unit 330, match the abnormal data with the existing abnormal data pattern and store the abnormal data or generate a new abnormal data pattern, and update the data pattern detection routine to include the new abnormal data pattern.

The controller 320 may transmit information about the data pattern detection routine to the appliance and/or the user terminal.

The controller 320 may communicate with a CS server that manages the home visit repair service through the communication unit 310, send a request for the home visit repair service to the CS server, and receive, through the communication unit 310, information related to the home visit repair service and information about the failure history and failure repair history from the CS server. The controller 320 may deliver, to the CS server, information available for the home visit repair service, e.g., the historic information about the appliance, such as failure history, failure repair history, manufacture information, environment information about the environment (mean temperature, mean humidity, or installation height) where the appliance is installed, customer profile information, etc.

The storage unit 330 may include a ROM storing a control program to operate the managing server and a RAM that stores signals or data input from the outside of the managing server or is used as a storage area for tasks performed on the managing server. The diagnosis treatment knowledge DB 122 storing information available for predicting a failure in at least one appliance and a data pattern detection routine used to classify the operation data of the appliance may be included in the storage unit 330 or may be a separate component. The diagnosis treatment knowledge DB 122 may store at least one of operation data, failure histories, control methods for delaying failure, failure repair histories, manufacture information, environment information, and customer profile information. The data pattern detection routine may be also stored in the diagnosis treatment knowledge DB 122 or in a separate storage space.

Figure 4:
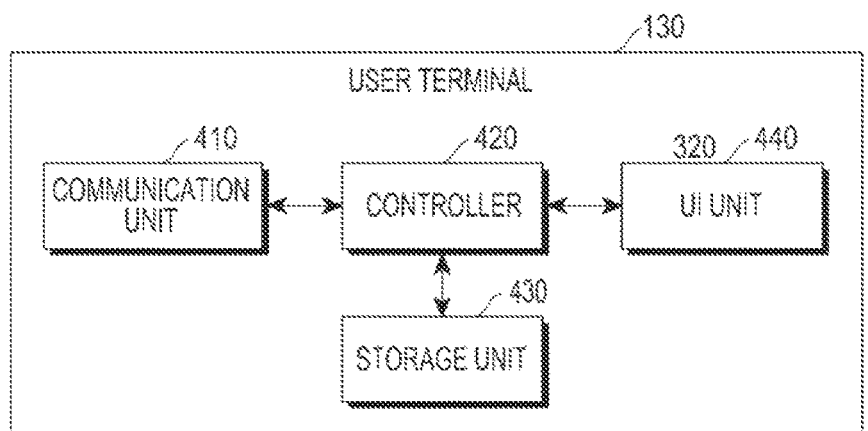
FIG. 4 is a block diagram schematically illustrating a configuration of a user terminal according to an embodiment.

FIG. 4 is a block diagram schematically illustrating a configuration of a user terminal capable of controlling an appliance based on failure prediction according to an embodiment. The user terminal may be configured with at least one or more of the components shown.

Referring to FIG. 4, the user terminal may include a communication unit 410, a controller 420, e.g., a processor and/or a microprocessor, a storage unit 430, and a UI unit 440.

The communication unit 410 includes a communication interface that supports the controller 420 to be able to communicate with at least one appliance and/or the managing server over the Internet. As an example, the communication unit 410 may include a wired communication module and/or a wireless communication module that supports at least one of Wi-Fi, Zigbee, Bluetooth, NFC, and Z-wave and may access the appliance directly or via a home gateway or CPE. The communication unit 410 may include a broadband communication module such as 3rd generation partnership project (3GPP) or long-term evolution (LTE) and may communicate with the managing server via the Internet.

The controller 420 may receive information about the data pattern detection routine for the appliance from the managing server through the communication unit 410 and may deliver the received information about the data pattern detection routine to the appliance. As an example, the controller 420 may gather, from the appliance, operation data generated in the appliance through the communication unit 410, classify the gathered operation data into normal data or abnormal data by the received information about the data pattern detection routine, and report the classified abnormal data to the managing server. The classified normal data may be stored in the storage unit 430 during a predetermined period.

The storage unit 430 may include a ROM storing a control program to operate the user terminal and a RAM that stores signals or data input from the outside of the user terminal or is used as a storage area for tasks performed on the user terminal. As an example, the storage unit 430 may store the information about the data pattern detection routine to classify the operation data generated in the appliance.

The UI unit 440 may provide information (e.g., control commands or home visit repair service schedule) delivered from the controller 420 to the user or may receive a user input and transfer it to the controller 420. The UI unit 440 may include a display, a touchscreen, at least one physical button, at least one light emitting diode (LED), a microphone, and/or a speaker.

At least one of the controllers 220, 320, and 420 of FIGS. 2 to 4 may be embodied in at least one hardware chip and provided in an electronic device. For example, the controller may be formed in a dedicated hardware chip for AI or in part of an existing general-purpose processor (e.g., a CPU or application processor) or a graphic dedicated processor (e.g., graphics processing unit (GPU)) and be provided in various electronic devices. In this case, the dedicated hardware chip for AI may be a dedicated processor specified for probability computation, which may quickly process AI computation tasks, e.g., machine learning, with a better parallel processing performance than existing general-purpose processors.

Figure 5:
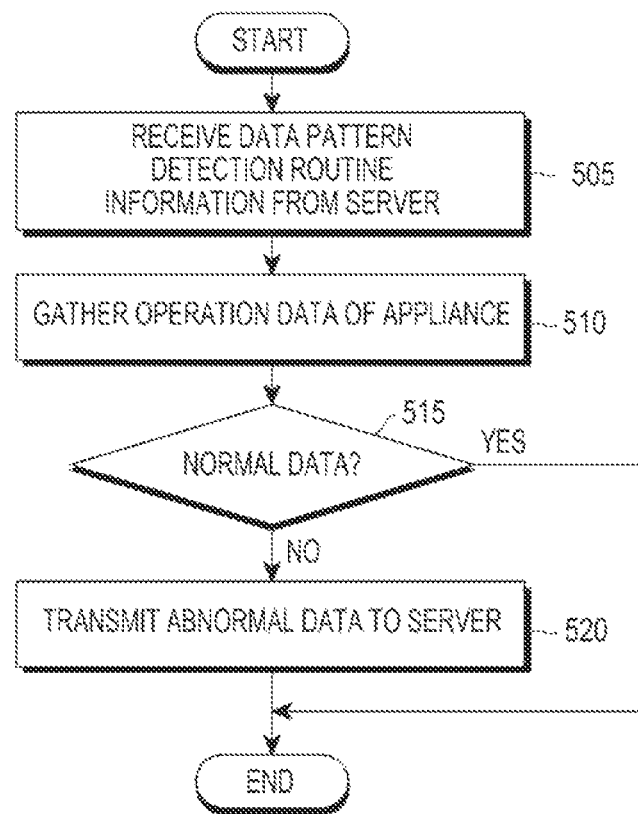
FIG. 5 is a flowchart illustrating operations of an appliance according to an embodiment.
Figure 6:
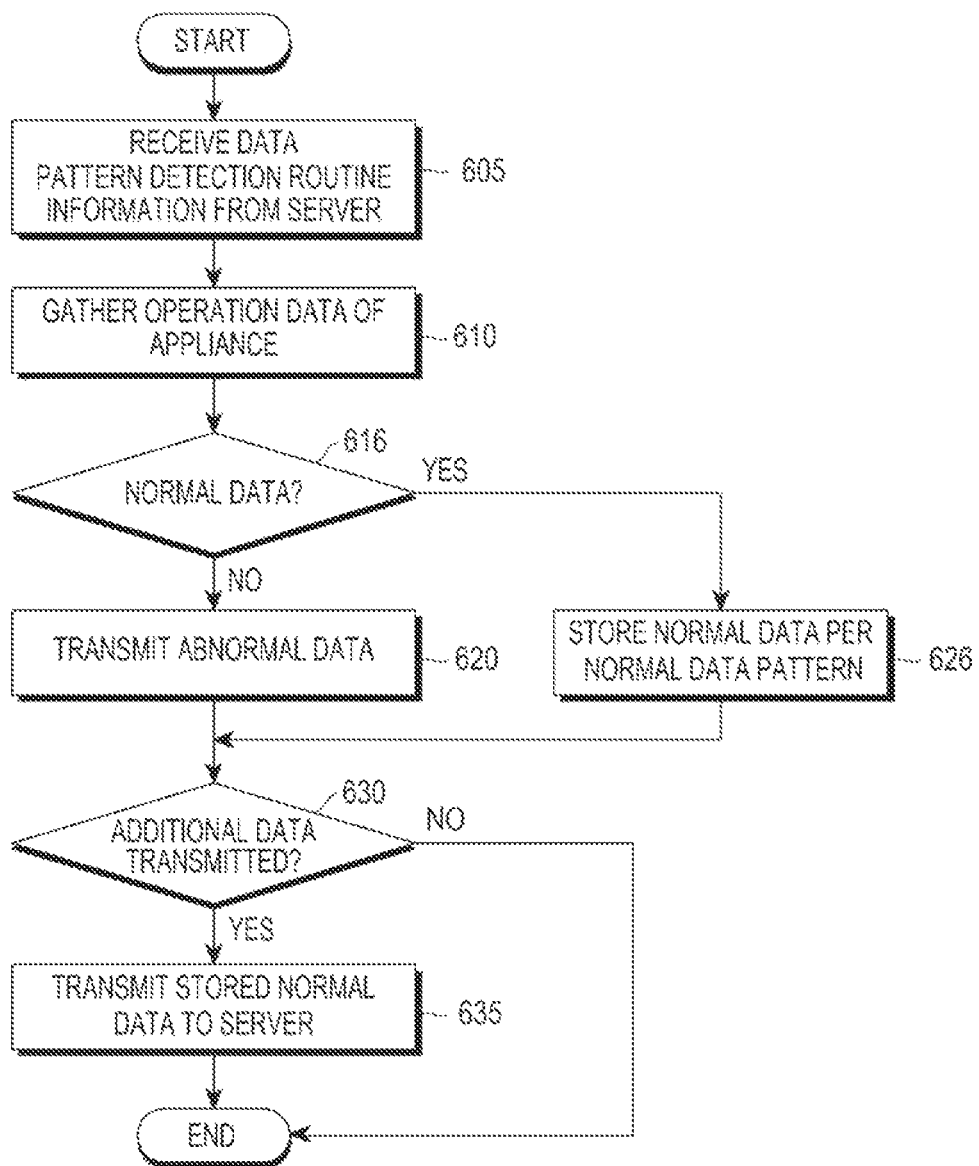
FIG. 6 is a flowchart illustrating operations of an appliance according to an embodiment.

FIGS. 5 and 6 are flowcharts describing an aspect of efficiently transmitting appliance operation data from an appliance to a managing server.

FIG. 5 is a flowchart illustrating operations of an appliance that transmits abnormal data of the appliance to a managing server according to an embodiment.

Referring to FIG. 5, in operation 505, the appliance receives information about a data pattern detection routine that targets appliance operation data, from the managing server. The data pattern detection routine includes information used to detect abnormal data needed to be reported to the managing server among various pieces of operation data that are generated in the appliance. As an example, the data pattern detection routine may include at least one among at least one pre-defined normal data pattern and at least one pre-defined abnormal data pattern. As an example, the data pattern detection routine may contain information about at least one among at least one pre-defined normal data pattern and at least one pre-defined abnormal data pattern. According to an embodiment, the abnormal data may include operation data item(s) generated in an abnormal circumstance. Various methods for detecting abnormal data are described below in detail.

In operation 510, the appliance gathers operation data including sensor data and operation parameters of various items generated as the appliance is operated. In operation 515, the appliance determines whether the gathered operation data is normal data or abnormal data based on the received information about the data pattern detection routine.

As an example, the appliance may calculate the degree of similarity between the gathered operation data and the normal data pattern defined by the data pattern detection routine and determine whether the degree of similarity exceeds a predetermined threshold. When the degree of similarity exceeds the threshold, the appliance may determine that the gathered operation data matches the normal data pattern. Where the operation data substantially matches the normal data pattern, for example, 75% or more, the appliance may determine that the operation data is normal data. Otherwise, the appliance may determine that the operation data is abnormal data.

As an example, the appliance may calculate the degree of similarity between the gathered operation data and the abnormal data pattern defined by the data pattern detection routine and determine whether the degree of similarity exceeds a predetermined threshold. When the degree of similarity exceeds the threshold, the appliance may determine that the gathered operation data matches the abnormal data pattern. Where the operation data matches the abnormal data pattern, the appliance may determine that the operation data is abnormal data.

As an example, a cosine similarity measuring method that uses the cosine distance between vectors in a multi-dimensional space may be used to determine the degree of similarity. Where the cosine similarity is used, the distance between a multi-dimensional vector consisting of multiple values contained in the operation data and a same-order multi-dimensional vector consisting of multiple vectors contained in a (normal or abnormal) data pattern given by the data pattern detection routine may be calculated, and the calculated distance may be compared with the threshold. Other various methods may also be used to determine the degree of similarity.

Where the operation data is determined by the received information about the data pattern detection routine to be abnormal data, the appliance transmits the abnormal data to the managing server in operation 520. The abnormal data may contain at least one among information about the time of generating the abnormal data, appliance identifier information for identifying the appliance, and sensor data. Where the operation data is determined to be normal data, the normal data may be stored in the storage unit of the appliance temporarily, i.e., during a predetermined period.

FIG. 6 is a flowchart illustrating operations of an appliance that transmits operation data of the appliance to a managing server according to an embodiment.

Referring to FIG. 6, in operation 605, the appliance receives information about a data pattern detection routine that targets appliance operation data, from the managing server. In operation 610, the appliance gathers operation data including sensor data and operation parameters of various items generated as the appliance is operated. In operation 615, the appliance determines whether the gathered operation data is normal data or abnormal data based on the received information about the data pattern detection routine. According to an embodiment, the appliance may perform operation 615 based on a predetermined cycle or based on a predetermined event.

Where the operation data is determined by the received information about the data pattern detection routine to be abnormal data, the appliance transmits the abnormal data to the managing server in operation 620. Where the operation data is determined by the received information about the data pattern detection routine to be normal data, the appliance stores the normal data in the storage unit of the appliance for a predetermined period in operation 625.

In operation 630, the appliance determines whether additional data transmission is appropriate based on at least one predetermined condition. As an example, the appliance may determine to perform additional data transmission based on a predetermined cycle. As an example, the appliance may determine to perform additional data transmission upon receipt of a request signal for additional data from the managing server. As an example, where the user uses a home visit repair service related to the appliance, the appliance may determine to perform additional data transmission when a difference between the time of use of the home visit repair service and the time of production of abnormal data reported latest exceeds a predetermined threshold (e.g., a valid period).

Upon determining that additional data transmission is appropriate, the appliance transmits the most recent normal data stored in the storage unit to the managing server in operation 635. The normal data may include operation parameters and/or sensor data generated when the appliance operates, metadata such as information about the normal data pattern to which the normal data belongs, and/or information related to the frequency of occurrence related to the normal data pattern.

Figure 7:
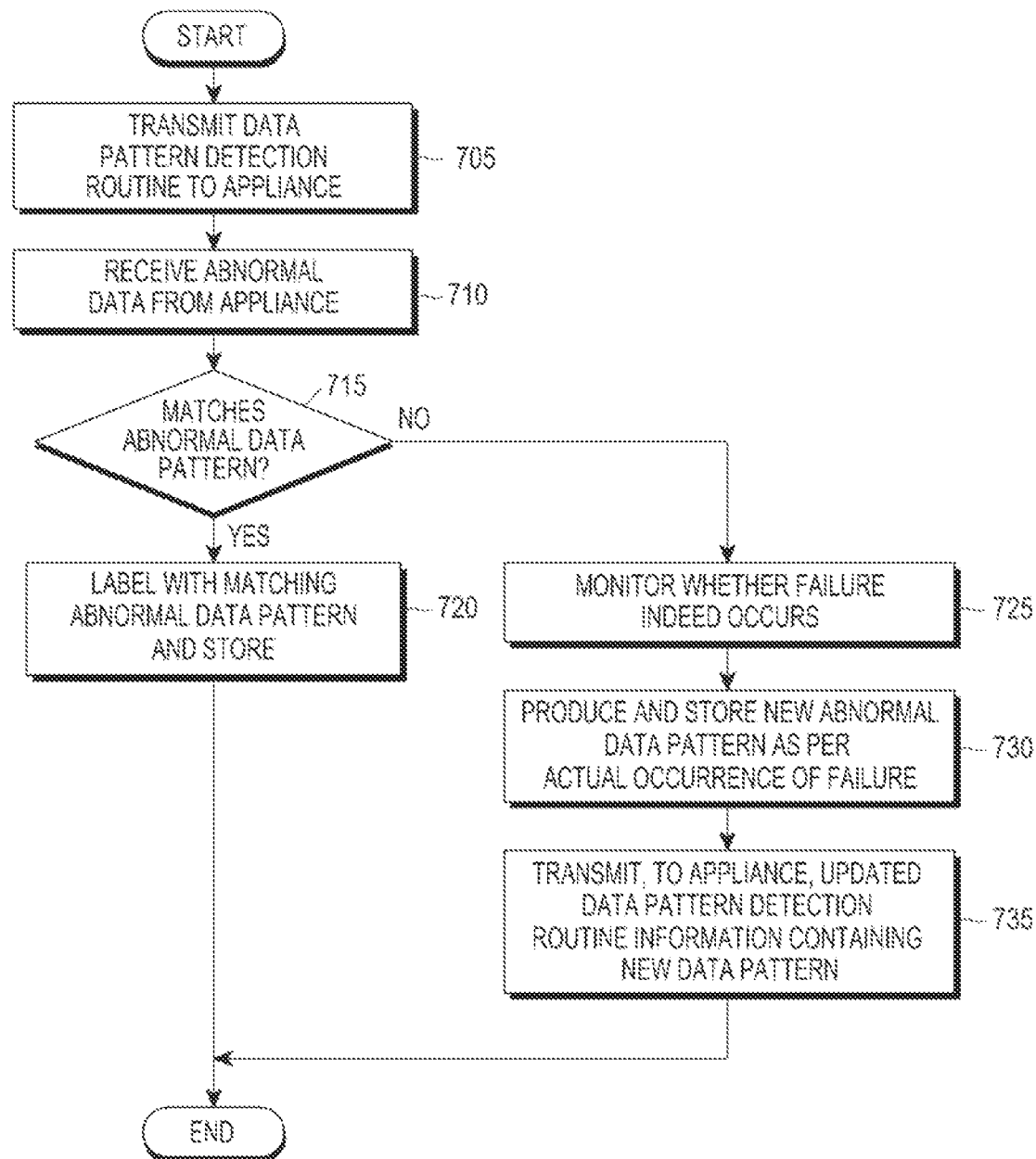
FIG. 7 is a flowchart illustrating operations of a managing server according to an embodiment.

FIG. 7 is a flowchart illustrating operations of a managing server that provides a data pattern detection routine to an appliance according to an embodiment. Although the embodiment described herein is directed to the managing server communicating with the appliance to provide information about the data pattern detection routine, it should be noted that the same description may also apply where the user terminal, rather than the appliance, communicates with the managing server to detect the abnormal data related to the appliance.

Referring to FIG. 7, in operation 705, the managing server transmits information about a data pattern detection routine that targets appliance operation data, to the appliance. The data pattern detection routine is intended for detecting abnormal data needed to be reported to the managing server among various pieces of operation data generated in the appliance, and the data pattern detection routine may include methods for determining abnormal data and information about at least one pre-defined normal data pattern and/or at least one pre-defined abnormal data pattern.

In operation 710, the managing server receives abnormal data containing at least one or more data items and appliance identifier information and time of production information from the appliance. In operation 715, the managing server compares the received abnormal data with the information about the data pattern detection routine transmitted in operation 705 and determines whether the received abnormal data matches the existing abnormal data pattern contained in the data pattern detection routine unit 126. As an example, the managing server may calculate the degree of similarity between the received abnormal data and the existing abnormal data pattern and determine whether the degree of similarity exceeds a predetermined threshold. When the degree of similarity exceeds the threshold, the managing server determines that the received abnormal data matches the existing abnormal data pattern. In operation 720, the managing server labels the received abnormal data to correspond to the existing abnormal data pattern and stores the same.

When the received abnormal data does not match the existing abnormal data pattern, the managing server monitors whether a failure related to the abnormal data actually occurs in the appliance during a predetermined period in operation 725. In other words, to create a new pattern of the abnormal data, the managing server determines whether the abnormal circumstance where the occurrence of the abnormal data actually causes a failure. As an example, the managing server monitors whether the failure history and failure repair history about the appliance is received during a predetermined period after the abnormal data is received. Where the appliance failure history and failure repair history information are received, the managing server determines whether the failure which occurred in the appliance is related to the abnormal data based on the received information. As an example, where the abnormal data contains an operation parameter or sensor data of a part exchanged or repaired in the failure repair history, the managing server may determine that the failure which occurred in the appliance is related to the abnormal data. As an example, where the failure item indicated in the failure history is contained in the abnormal data, the managing server may determine that the failure which occurred in the appliance is related to the abnormal data.

Where the failure related to the abnormal data occurs in the appliance, the managing server generates a new abnormal data pattern that indicates the abnormal data and updates the data pattern detection routine for the appliance to include the new abnormal data pattern in operation 730. According to an embodiment, unless a failure related to the abnormal data occurs in the appliance during a predetermined period, the managing server may determine that the abnormal data is normal data, produce a new normal data pattern to indicate the normal data, and add the new normal data pattern to the data pattern detection routine for the appliance. In operation 735, the managing server transmits, to the appliance, the updated data pattern detection routine containing the new abnormal data pattern or the new normal data pattern, and/or stores the same in the data pattern detection routine unit 126.

According to an embodiment, methods for determining abnormal data may be classified depending on data types as shown in Table 1.

TABLE 1

| Data type | Methods for determining abnormal data |
|---|---|
| Numeric | Time-series data that not reach or exceed normal range<br>Statistical values (mean, minimum, maximum, least frequent, and mid values)<br>Interval (time interval that a particular numerical value indicates)<br>Trend (long-term or short-term variation)<br>Ratio (frequency, number of times)<br>Similarity/correlation coefficient |
| Binary | Interval (time interval that a particular numerical value indicates)<br>Similarity/correlation coefficient |
| Nominal | Interval (time interval that a particular numerical value indicates)<br>Ratio (frequency, number of times) |
| Ordinal | Interval (time interval that a particular numerical value indicates)<br>Trend (long-term or short-term variation)<br>Ratio (frequency, number of times) |
| Combination of heterogeneous data | Specificity of heterogeneous data combination (e.g., [cooling + set temperature: 30 degrees Celsius])<br>Generation ratio for specific data combination (frequency, number of times) |

As an example, where the appliance is an air conditioner, the numerical data items may be temperature, indoor temperature, outdoor temperature, and/or duration of operation. As an example, where the appliance is a refrigerator, the numerical data items may be temperature for refrigerating and/or freezing, indoor temperature, outdoor temperature, and/or defrost cycle. As an example, where the appliance is a washer, the numerical data items may be operation time, operation count, laundry load, dehydration level, and/or level of dryness.

As an example, the data pattern detection routine may define at least one of a normal range for a particular numerical data item, at least one statistical value, a time interval that a particular numerical value (or within a particular range) indicates, a variation trend during a predetermined period, a ratio of a particular numerical value (or within a particular range), and a degree of similarity/correlation coefficient with respect to a predetermined normal data pattern. Where the gathered data item falls out of the normal range defined by the data pattern detection routine, the appliance may determine that the gathered data item is abnormal data. As an example, the data pattern detection routine may define a threshold for the time interval indicated by the particular numerical value of the discrete data item. Where the time interval indicated by the particular numerical value of discrete data item is smaller than the threshold defined by the data pattern detection routine, the appliance may determine that the gathered data item is normal data.

Upon detecting abnormal data of a discrete, nominal, ordinal, or heterogeneous data type, the appliance may determine that an abnormal event which is difficult to identify occurs and immediately transmit the abnormal data to the managing server.

According to an embodiment, upon detecting abnormal data of a numerical data type, the appliance may classify the abnormal data according to the degree of danger.

Table 2 below shows examples of classifications for numerical abnormal data according to the degree of risk.

TABLE 2

| Data type | Detailed classifications based on degree of risk |
|---|---|
| Numeric | High risk-group data (safety accident/risk of fire)<br>Mid risk-group data (induce secondary accident/failure if not treated)<br>Low risk-group data (inefficient operation, simple part replacement) |

As set forth above, the numerical abnormal data may be classified as one of high risk, mid risk, or low risk according to its range, statistical value, interval, trend, ratio, or similarity/correlation coefficient. According to an embodiment, the data pattern detection routine may contain classification criterion information for determining the degree of risk for each data item of numerical abnormal data. The classification criterion may include at least one of, e.g., a threshold (or range) for determining a high-risk group, a threshold (or range) for determining a mid risk group, and a threshold (or range) for determining a low risk group.

According to an embodiment, upon detecting numerical abnormal data, the appliance may identify the degree of risk according to the numerical abnormal data value and may immediately transmit the degree of risk along with the abnormal data to the managing server. According to an embodiment, the appliance may determine to immediately transmit, to the managing server, or store the abnormal data according to the degree of risk of the numerical abnormal data.

According to an embodiment, operation data that is not determined to be abnormal data may be classified as normal data, and the normal data may be divided as shown in Table 3 below.

TABLE 3

| Methods of classification | Methods of transmission |
| --- | --- |
| In order of grade based on difference from normal data pattern | Transmit in order of higher chance of being classified as abnormal data |
| | Transmit during network idle time |
| In order of latest data (minute/hour/day/month) | Transmit based on network availability |
| | Transmit during different time zones based on data size |
| In order of data size | |
| Per data type | Transmit when memory is full and thus requires refreshing |
| | Transmit before and after diagnosed with identifiable failure |

According to an embodiment, the operation data not determined to be the abnormal data may be stored in the memory of the appliance and may be transmitted to the managing server upon determining that additional data transmission is required, e.g., when a request is received from the managing server. The normal data may be stored in the memory of the appliance until the memory capacity is insufficient due to the memory being full, a valid period elapses, it is transmitted to the managing server, or the appliance is diagnosed with a failure.

According to an embodiment, the appliance may classify the gathered operation data according to the degree of similarity with the normal data pattern given by the data pattern detection routine, and upon receipt of an additional data request signal from the managing server, transmit the classified operation data to the managing server in order of higher chance of being classified as abnormal data.

Figure 8A:
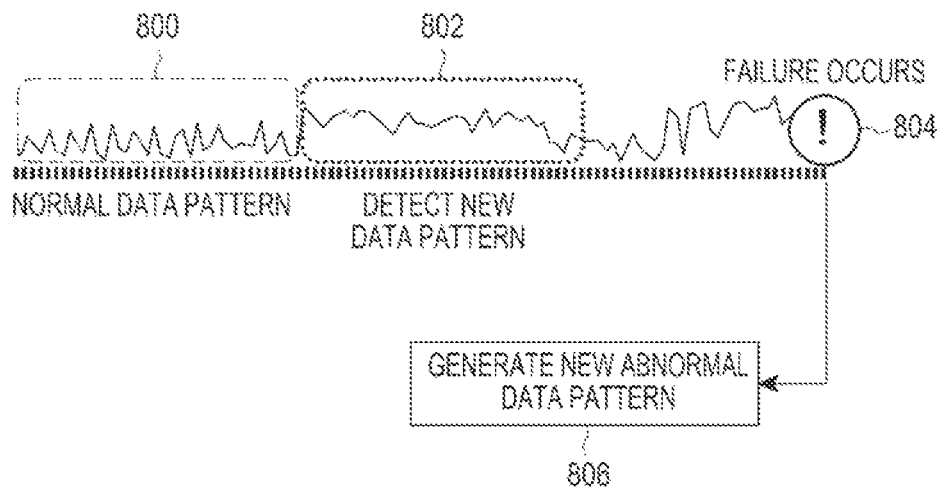
FIGS. 8A, 8B, and 8C are views illustrating an abnormal data pattern according to an embodiment.
Figure 8B:
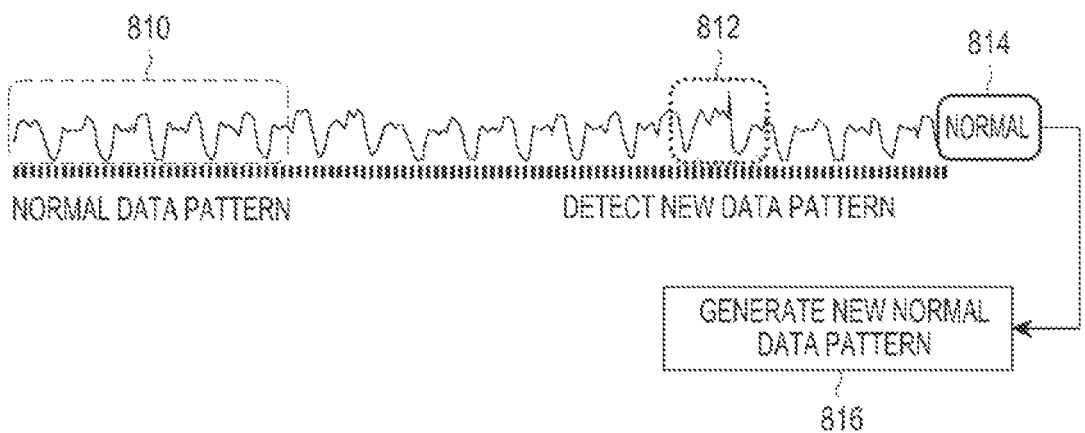
Figure 8C:
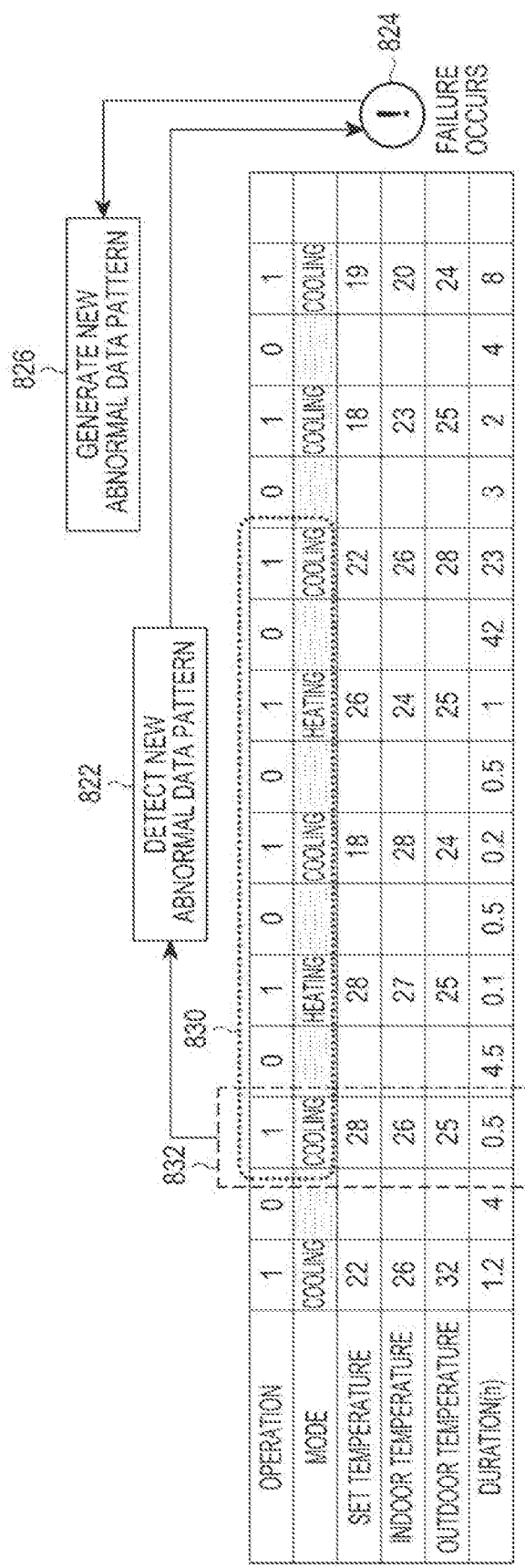

FIGS. 8A, 8B, and 8C are views illustrating an abnormal data pattern according to an embodiment.

FIGS. 8A and 8B illustrate examples of variations over time in numerical operation data among operation data of the appliance.

Referring to FIG. 8A, data values denoted with reference number 800 belong to a normal data pattern that may be defined by the data pattern detection routine. A new data pattern which does not belong to at least one existing normal data pattern defined by the data pattern detection routine may be detected as denoted by reference number 802. According to an embodiment, the appliance may compare the gathered operation data with at least one normal data pattern given by the data pattern detection routine to calculate the degree of similarity, and where the degree of similarity with the at least one normal data pattern does not exceed a predetermined threshold, the appliance may report abnormal data containing the data pattern 802 to the managing server.

According to an embodiment, the data pattern 802 may include particular numerical values having a shorter interval than the threshold given in the data pattern detection routine. According to an embodiment, the data pattern 802 may have a mean value that exceeds the normal range given in the data pattern detection routine. In such a case, the data pattern 802 may determine that it is abnormal data based on the data pattern detection routine.

The managing server receives the abnormal data and monitors whether a failure indeed occurs in the appliance. When a failure actually occurs in the appliance as denoted with reference number 804, the managing server generates a new abnormal data pattern 806 containing the received abnormal data. The new abnormal data pattern may be added to the data pattern detection routine and stored in the data pattern detection routine unit 126. According to an embodiment, where the information about the failure history of the appliance is received from the CS server within a predetermined period after the abnormal data is received, and the failure of the appliance indicated by the failure history information is related to the abnormal data, the managing server may determine to generate the received abnormal data as the new abnormal data pattern 806.

Referring to FIG. 8B, data values denoted with reference number 810 belong to a normal data pattern that may be defined by the data pattern detection routine. A new data pattern which does not belong to at least one normal data pattern defined by the data pattern detection routine may be detected as denoted with reference number 812. According to an embodiment, where the data pattern 812 contains a maximum value larger than the threshold given in the data pattern detection routine, the appliance may determine that the data pattern 812 is abnormal data and report abnormal data containing the data pattern 812 to the managing server.

The managing server receives the abnormal data and monitors whether a failure indeed occurs in the appliance. Where the appliance causes no failure but normally operates during a predetermined period as denoted with reference number 814, the managing server determines that the received abnormal data is normal data and generates a new normal data pattern 816 containing the normal data. The new normal data pattern 816 may be added to the data pattern detection routine and stored in the data pattern detection routine unit 126. According to an embodiment, where the information about the failure history of the appliance is not received from the CS server within a predetermined period after the abnormal data is received, or where the failure of the appliance indicated by the failure history information is not related to the abnormal data, the managing server may determine that the received abnormal data is normal data.

Referring to FIG. 8C, where the appliance is an air conditioner, the air conditioner gathers operation data including operation modes, set temperatures, indoor temperature, outdoor temperature, duration of operation, or other various data items. The data pattern of reference number 830 denotes a change in operation mode of the air conditioner. The air conditioner may detect continuous variations in operation mode between heating and cooling and determine that an abnormal data pattern has occurred. According to an embodiment, where the frequency of variation in operation mode is larger than a threshold given in the data pattern detection routine, the air conditioner may report abnormal data containing the data pattern 830 to the managing server.

The data pattern 832 includes a combination of heterogeneous data items such as the operation mode, set temperature, indoor temperature, outdoor temperature, and duration of operation of the air conditioner. The air conditioner may detect the set temperature [28 degrees Celsius]

being higher than the indoor temperature [26 degrees Celsius] in the operation mode [Cooling], i.e., a set of conflicting operation data, and determine that an abnormal data pattern has occurred. According to an embodiment, the air conditioner may determine that an abnormal data pattern occurs by the specificity of the heterogeneous data combination and report the abnormal data containing the data pattern 832 to the managing server. The specificity of the heterogeneous data combination may be defined as, e.g., when at least one first data item among data items included in the heterogeneous data combination is not included in a predetermined range determined by at least one second data item. In the example illustrated, where the set temperature, [28 degrees Celsius], in the data combination [Cooling, set temperature: 28 degrees Celsius, Indoor temperature: 26 degrees Celsius] consisting of heterogeneous data items, does not belong to a range, e.g., [range lower than 26 degrees Celsius], determined by the operation mode [Cooling and the indoor temperature 26 degrees Celsius], the air conditioner may determine 822 that the data combination is abnormal data and report the abnormal data containing the data combination to the managing server.

The managing server receives the abnormal data and monitors whether a failure indeed occurs in the appliance. When a failure actually occurs in the appliance as denoted with reference number 824, the managing server generates a new abnormal data pattern 826 containing the received abnormal data. The new abnormal data pattern may be added to the data pattern detection routine and stored in the data pattern detection routine unit 126. According to an embodiment, where the information about the failure history of the appliance is received from the CS server within a predetermined period after the abnormal data is received, and the failure of the appliance indicated by the failure history information is related to the abnormal data, the managing server may determine to generate the received abnormal data as the new abnormal data pattern 826.

Figure 9:
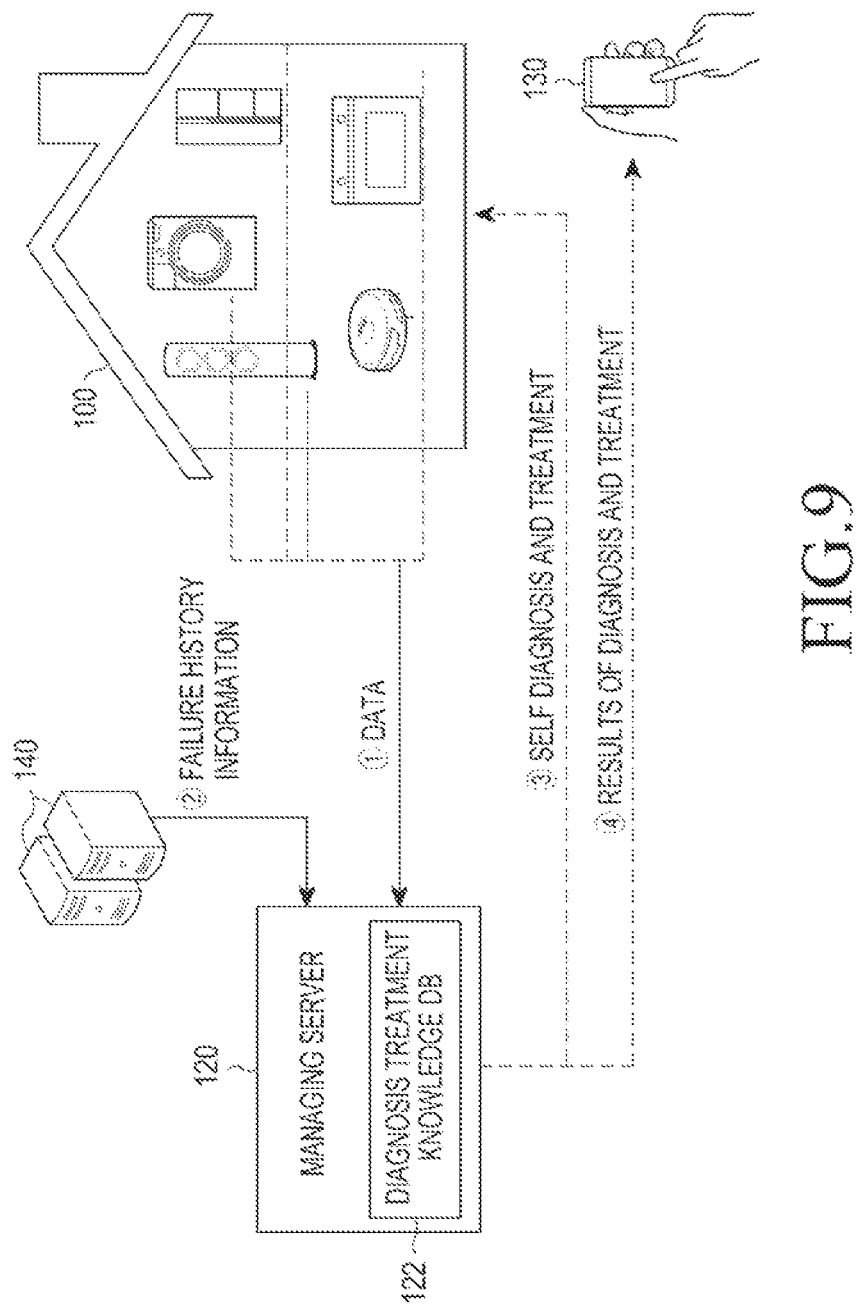
FIG. 9 is a view illustrating a provision of a diagnosis treatment solution for a failure in an appliance according to an embodiment.
Figure 10:
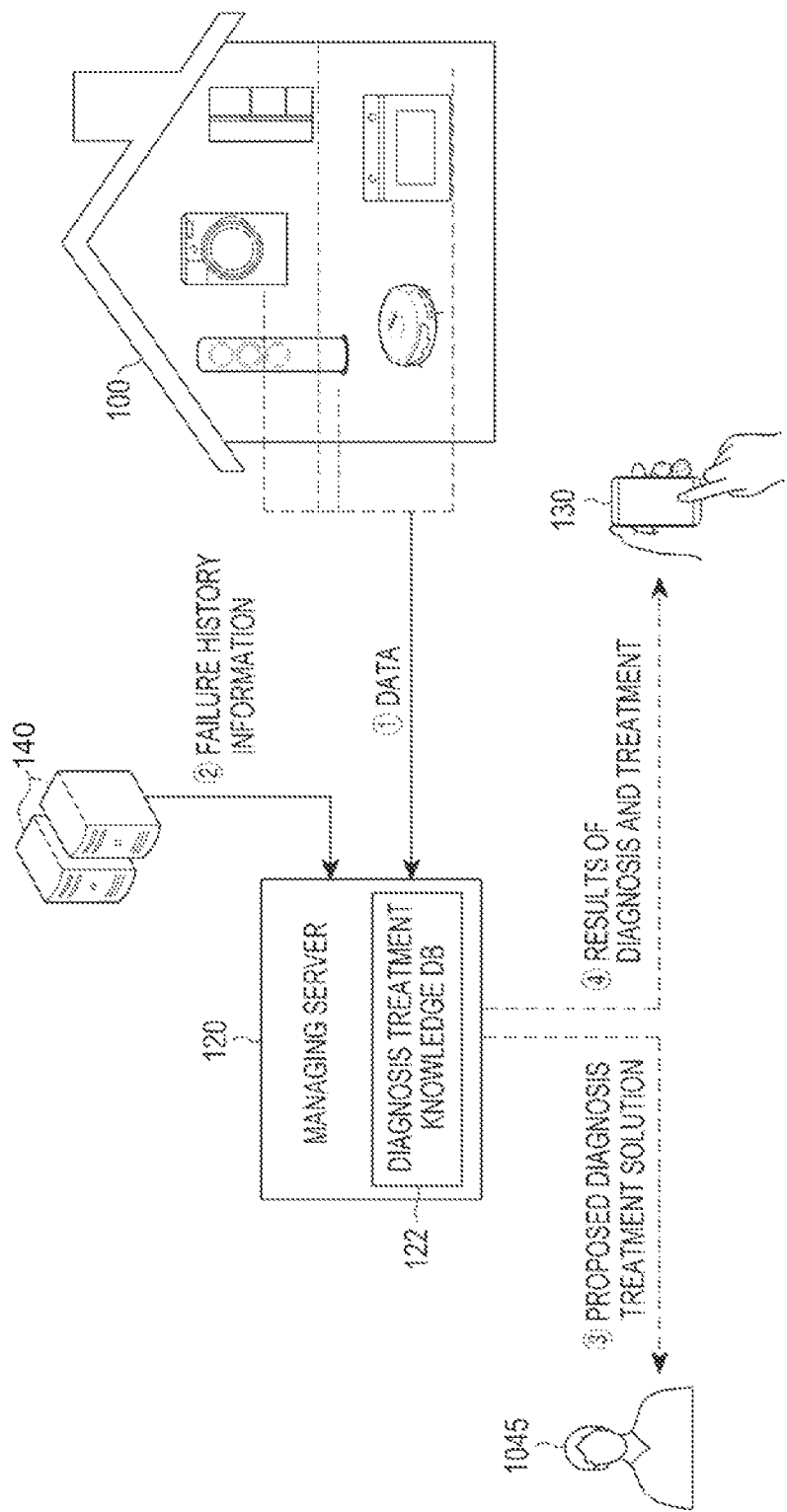
FIG. 10 is a view illustrating a provision of a diagnosis treatment solution according to an embodiment.
Figure 11:
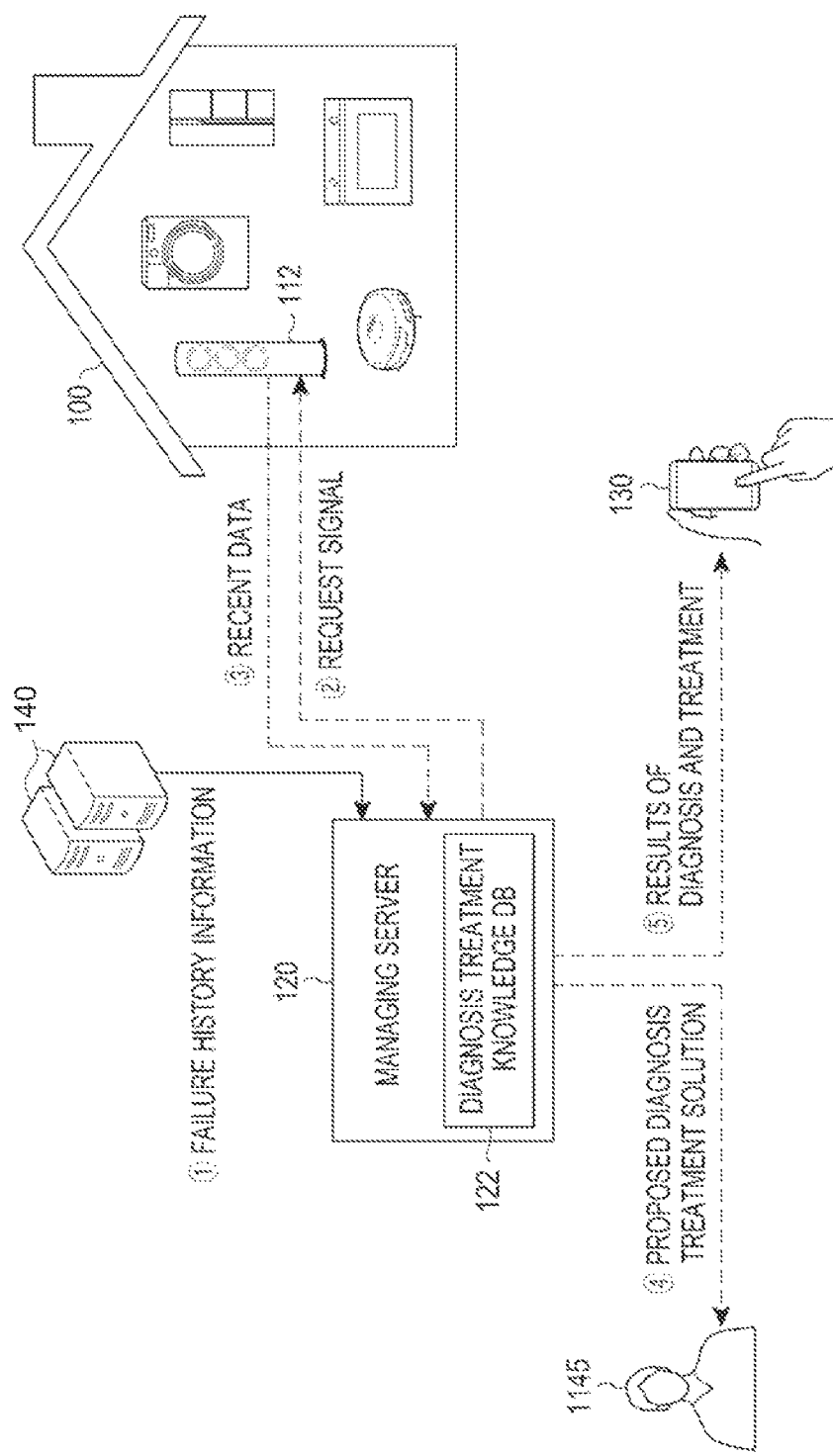
FIG. 11 is a view illustrating a provision of a diagnosis treatment solution according to an embodiment.

FIGS. 9 to 11 illustrate scenarios in which an abnormal operation of appliances is precisely and quickly detected using a diagnosis treatment knowledge DB build up based on operation data gathered from the appliances and a diagnosis/treatment is performed to address the abnormal operation.

According to an embodiment, the diagnosis treatment knowledge DB may store at least one diagnosis treatment solution that may be used to repair or treat a failure predicted or caused on the appliances, based on the operation data gathered from the appliances and historic information gathered from the CS server, such as failure history and failure repair history and manufacture information about the appliances, environment information indicating the environment (e.g., mean temperature, mean humidity, or installation height) where the appliances are installed, and customer profile information.

Each diagnosis treatment solution may include diagnosis items and treatment items related to the failure. As an example, a diagnosis treatment solution related to a lowering in the cooling performance or noise creation in the air conditioner may include [diagnosis: coolant leakage, treatment: add coolant] or [diagnosis: damage to compressor, treatment: replace compressor]. As an example, a diagnosis treatment solution related to a lowering in the dehydration performance or noise creation in the washer may include [diagnosis: imbalance, treatment: level] or [diagnosis: part (bearing) failure, treatment: replace part (bearing)].

FIG. 9 is a view illustrating a scenario in which a diagnosis treatment solution for a failure in an appliance is provided to a user terminal according to an embodiment.

Referring to FIG. 9, appliances in a household system 100 may report abnormal data to a managing server 120 according to at least one of the above-described embodiments. (①) Each appliance may additionally report normal data to the managing server 120 based on a predetermined condition (e.g., the receipt of a request signal from the managing server 120). The managing server 120 receives the abnormal data from the appliances and stores an abnormal data pattern containing the received abnormal data in a diagnosis treatment knowledge DB 122. The managing server 120 may store a normal data pattern indicating the normal data additionally received from the appliances in the diagnosis treatment knowledge DB 122.

The managing server 120 receives failure history information about the appliances from a CS server 140. (②) The failure history information may contain a failure repair request for a particular appliance which is received by the CS server 140. Upon detecting the occurrence of a failure in the particular appliance based on the received information, the managing server 120 may search the diagnosis treatment knowledge DB 122 for a diagnosis treatment solution that may apply to the occurred failure and transmit information about the obtained diagnosis treatment solution to the corresponding appliance. (③) As an example, the appliance may display or output the received diagnosis treatment solution information through a UI to put the user on notice. As an example, the appliance may control the operation parameters of the native function executing unit based on the received diagnosis treatment solution information.

According to an embodiment, the managing server 120 may transmit the diagnosis treatment solution information to a user terminal 130 registered for the appliance. Where the appliance is able to treat the failure on its own with the diagnosis treatment solution, the managing server 120, after sending the diagnosis treatment solution information to the appliance, may transmit the result to the user terminal 130. (④) As an example, the user terminal 130 may display or output the received diagnosis treatment solution information through its UI to put the user on notice. As an example, the user terminal 130 may transmit control commands to control the operation parameters of the appliance to the appliance according to the received diagnosis treatment solution information.

FIG. 10 is a view illustrating a scenario in which a failure in an appliance is detected and a diagnosis treatment solution is provided to an engineer according to an embodiment.

Referring to FIG. 10, appliances in a household system 100 may report abnormal data to a managing server 120 according to at least one of the above-described embodiments. (①) Each appliance may additionally report normal data to the managing server 120 based on a predetermined condition (e.g., the receipt of a request signal from the managing server 120). The managing server 120 receives the abnormal data from the appliances and stores an abnormal data pattern containing the received abnormal data in a diagnosis treatment knowledge DB 122. The managing server 120 may store a normal data pattern indicating the normal data additionally received from the appliances in the diagnosis treatment knowledge DB 122.

The managing server 120 receives failure history information about the appliances from a CS server 140. (②) The failure history information may contain a failure repair request for a particular appliance which is received by the CS server 140. Upon detecting the occurrence of a failure in the particular appliance based on the received information, the managing server 120 may search the diagnosis treatment knowledge DB 122 for a diagnosis treatment solution that may apply to the caused failure and transmit information about the obtained diagnosis treatment solution to an engineer 1045 to handle the failure. (③) According to an embodiment, the managing server 120 may transmit the diagnosis treatment solution information to the terminal of the engineer 1045 allocated to treat the failure. After sending the diagnosis treatment solution information to the engineer 1045, the managing server 120 may send the result to the user terminal 130. (④)

FIG. 11 is a view illustrating a scenario in which a failure in an appliance is detected and recent data is gathered according to an embodiment.

Appliances in a household system 100 may report abnormal data to a managing server 120 according to at least one of the above-described embodiments. The managing server 120 receives the abnormal data from the appliances and stores an abnormal data pattern containing the received abnormal data in a diagnosis treatment knowledge DB 122.

Referring to FIG. 11, the managing server 120 receives failure history information about the appliances from a CS server 140. (①) The failure history information may contain a failure repair request for a particular appliance 112 which is received by the CS server 140. Upon detecting the occurrence of a failure in the particular appliance 112 based on the received information, the managing server 120 sends a request signal for operation data gathered during a predetermined period to the appliance 112. (②) In response to receipt of the request signal, the appliance 112 transmits recent data stored in its memory to the managing server 120. (③) The recent data may contain normal data and/or abnormal data gathered during a latest period previously determined from the appliance 112.

The managing server 120 analyzes the recent data and stores a data pattern containing the recent data in a diagnosis treatment knowledge DB 122 and searches the diagnosis treatment knowledge DB 122 for a diagnosis treatment solution that is applicable to the failure. Information about the diagnosis treatment solution obtained by the managing server 120 may be delivered by the managing server 120 to an engineer 1145 to treat the failure. (④) According to an embodiment, the managing server 120 may transmit the diagnosis treatment solution information to the terminal of the engineer 1145 assigned to treat the failure. After sending the diagnosis treatment solution information to the engineer 1145, the managing server 120 may send the result to the user terminal 130. (⑤)

Figure 12:
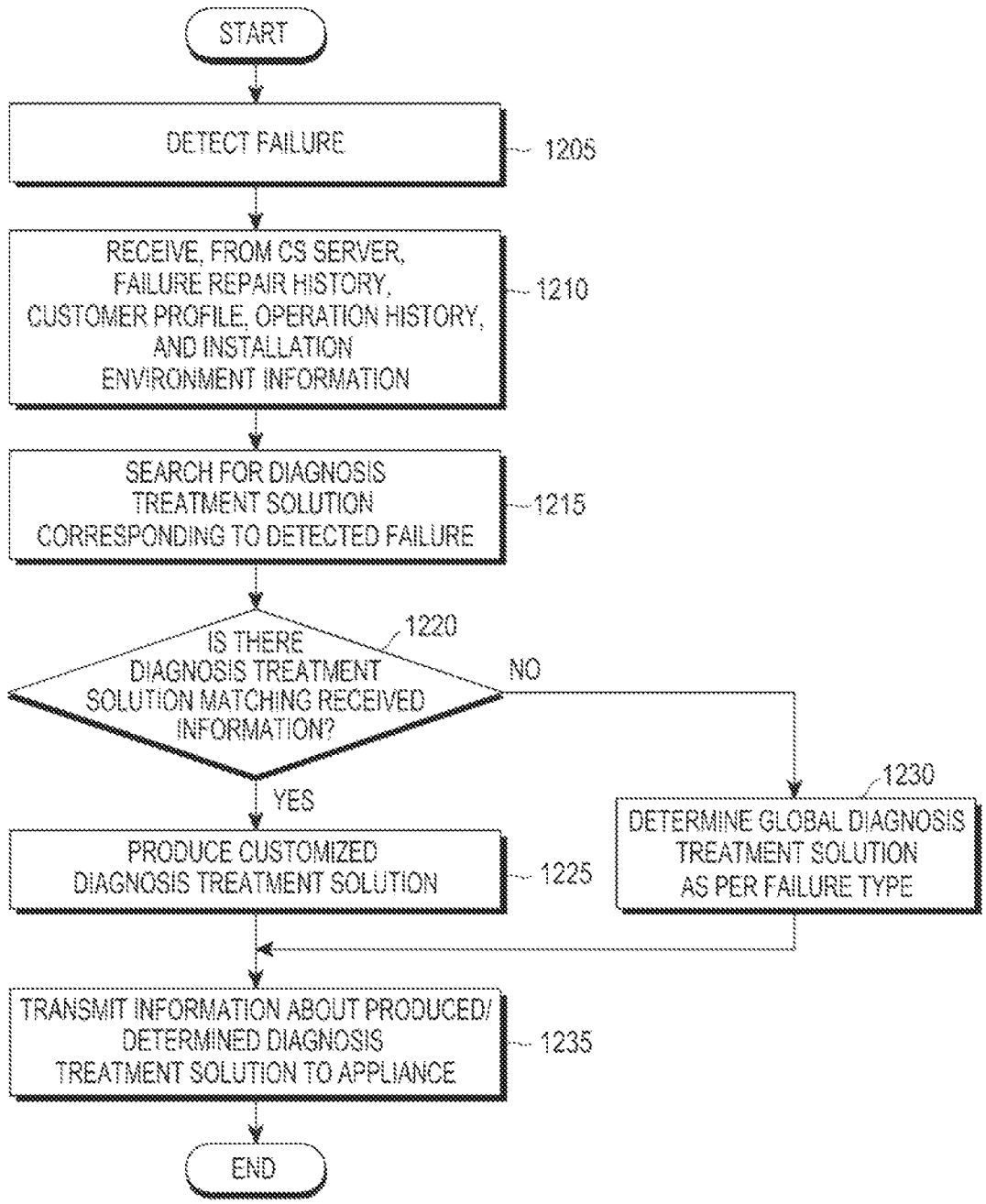
FIG. 12 is a flowchart illustrating operations of a managing server according to an embodiment.
Figure 13:
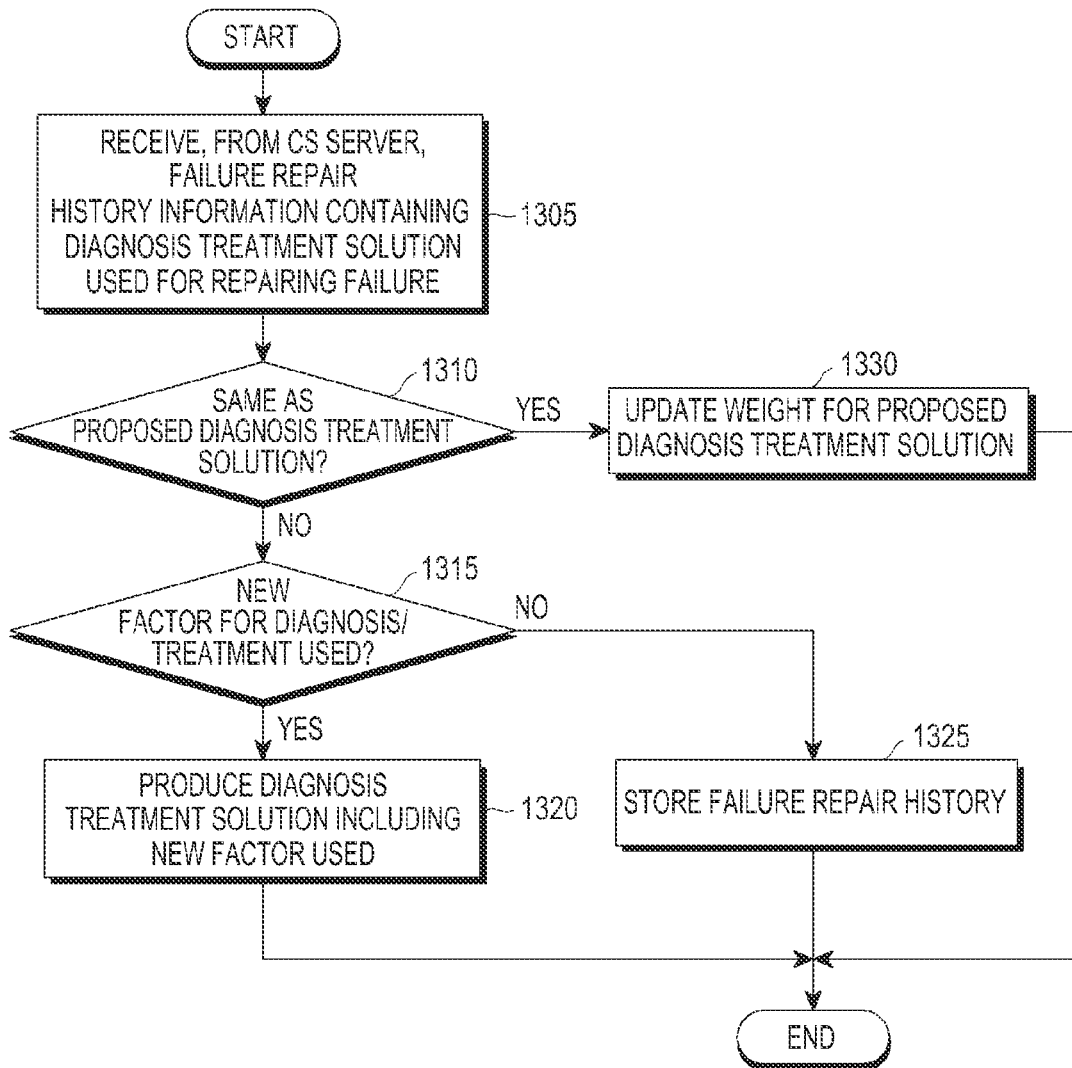
FIG. 13 is a flowchart illustrating operations of a managing server according to an embodiment.

FIGS. 12 and 13 are flowcharts illustrating searching for and providing a customized diagnosis treatment solution, which indicates information available for repairing or resolving a failure caused or predicted on appliances, from a diagnosis treatment knowledge DB based on operation data gathered from the appliances.

FIG. 12 is a flowchart illustrating operations of a managing server that provides a customized diagnosis treatment solution to address a failure in an appliance according to an embodiment.

Referring to FIG. 12, in operation 1205, a managing server detects a failure in an appliance. According to an embodiment, the managing server may receive failure history information about the appliance from a CS server and detect the CS server's receipt of a failure repair request for the appliance based on the information. According to an embodiment, the managing server may predict a failure that may occur in the appliance based on appliance operation data stored in a diagnosis treatment knowledge DB.

In operation 1210, the managing server receives, from the CS server, historic information including at least one of failure repair history information about the appliance, customer profile information, operation history information, and installation environment information. As an example, the failure repair history information may contain information about the time that a home visit repair service was used and information about an item (e.g., a part or an operation parameter control value) repaired or replaced through the home visit repair service.

In operation 1215, the managing server searches the diagnosis treatment knowledge DB for at least one diagnosis treatment solution applicable to the type of the failure detected. Each diagnosis treatment solution may include diagnosis items and treatment items that may be determined for the failure.

In operation 1220, the managing server determines whether at least one diagnosis treatment solution obtained through the search includes a diagnosis treatment solution that matches the received information, e.g., the failure repair history for the appliance, customer profile, operation history, and installation environment. According to an embodiment, the managing server may calculate the degree of similarity between the failure repair history, customer profile, operation history, and installation environment, which are related to the obtained diagnosis treatment solution, and the failure repair history, customer profile, operation history, and installation environment for the appliance. Where the degree of similarity exceeds a predetermined threshold, the managing server may determine that the obtained diagnosis treatment solution matches the failure repair history, customer profile, operation history, and installation environment for the appliance. As an example, the degree of similarity may be calculated as the mean of the respective degrees of similarity of the failure repair history, customer profile, operation history, and installation environment.

Where a result of the determination reveals that there is the obtained diagnosis treatment solution substantially matching all or some of the failure repair history, customer profile, operation history, and installation environment for the appliance (e.g., more than a 75% match), the managing server applies the failure repair history, customer profile, operation history, and installation environment for the appliance to the obtained diagnosis treatment solution to generate a customized diagnosis treatment solution thereby optimized for the appliance in operation 1225. According to an embodiment, the diagnosis treatment knowledge DB may include diagnosis items that indicate the causes for failures that may occur in the appliance and treatment items that indicate methods of addressing the failures. As an example, knowledge about the causality for failure types may be stored in the diagnosis treatment knowledge DB as a triple type ontology network. As an example, the causality and probability for failure types may be stored in the diagnosis treatment knowledge DB as a Bayesian network.

If it is determined that there is no diagnosis treatment solution that substantially matches the failure repair history, customer profile, operation history, and/or installation environment for the appliance, the managing server determines that a global diagnosis treatment solution, e.g., a new treatment solution, is to be applied to the failure detected from the appliance, and generates the global diagnosis treatment solution for the appliance failure, in operation 1230.

In operation 1235, the managing server transmits the customized diagnosis treatment solution generated in operation 1225 or the global diagnosis treatment solution determined in operation 1230 to the appliance. According to an embodiment, the managing server may transmit information about the diagnosis treatment solution generated or determined to the user terminal registered for the appliance. According to an embodiment, the managing server may transmit the information about the diagnosis treatment solution generated or determined to an engineer assigned to treat the failure in the appliance.

FIG. 13 is a flowchart illustrating operations of a managing server that generates and updates a diagnosis treatment solution to address a failure in an appliance according to an embodiment.

Referring to FIG. 13, in operation 1305, a managing server receives, from a CS server, failure repair history information containing information about the diagnosis treatment solution actually used to repair a failure in an appliance. In operation 1310, the managing server determines whether a diagnosis treatment solution previously proposed to repair the failure in the appliance is the same as the diagnosis treatment solution contained in the failure repair history information. Specifically, the managing server may determine whether the diagnosis treatment solution contained in the failure repair history information contains the same diagnosis items and treatment items as the previously proposed diagnosis treatment solution. If the same, the managing server updates the weight that indicates the number of times of use or use frequency of the previously proposed diagnosis treatment solution in operation 1330.

If not, the managing server determines whether the diagnosis treatment solution actually used contains a new factor considered for diagnosis and treatment in operation 1315. The new factor means, e.g., a new diagnosis item and/or a new treatment item that is not indicated by the previously proposed diagnosis treatment solution. As an example, where the previously proposed diagnosis treatment solution related to noise creation in a washer contains [diagnosis: part (bearing) failure, treatment: replace part (bearing)] while the actually used diagnosis treatment solution contains [diagnosis: main board failure, treatment: replace main board], the managing server may determine that the new factor of [replace main board] has been used.

In operation 1320, the managing server generates a new diagnosis treatment solution containing the new factor in relation to the failure in the appliance and stores the generated diagnosis treatment solution in the diagnosis treatment knowledge DB.

In contrast, unless the actually used diagnosis treatment solution contains a new factor as compared with the previously proposed diagnosis treatment solution, the managing server stores the failure repair history for the appliance in the diagnosis treatment knowledge DB and terminates the operation.

Particular embodiments of the disclosure may be implemented as computer-readable codes in a computer-readable recording medium. The computer-readable recording medium is a data storage device that may store data readable by a computer system. Examples of the computer-readable recording medium may include ROMs, RAMs, CD-ROMs, magnetic tapes, floppy disks, optical data storage devices, and carrier waves (such as data transmission over the Internet). The computer-readable recording medium may be distributed by computer systems over a network, and accordingly, the computer-readable codes may be stored and executed in a distributed manner. Functional programs, codes, and code segments to attain embodiments may be readily interpreted by skilled programmers in the art to which the disclosure pertains.

The apparatuses and methods according to embodiments of the disclosure may be implemented in hardware, software, or a combination of hardware and software. Such software may be stored in a volatile or non-volatile storage device such as a ROM or other storage devices, a memory, such as a RAM, a memory chip, a device or an integrated circuit, or a storage medium, such as, e.g., a compact disc (CD), a digital video disc (DVD), a magnetic disk, or a magnetic tape, which allows for optical or magnetic recording while simultaneously read out by a machine (e.g., a computer). The methods according to embodiments of the disclosure may be implemented by a computer or a portable terminal including a controller and a memory, and the memory may be an exemplary machine-readable storage medium that may properly retain program(s) containing instructions for implementing the embodiments of the disclosure.

Accordingly, the disclosure encompasses a program containing codes for implementing the device or method set forth in the claims of this disclosure and a machine (e.g., computer)-readable storage medium storing the program. The program may be electronically transferred via any media such as communication signals transmitted through a wired or wireless connection and the disclosure properly includes the equivalents thereof.

The apparatuses according to embodiments of the disclosure may receive the program from a program providing device connected thereto by wire or wirelessly and store the same. The program providing apparatus may include a memory for storing a program including instructions enabling a program processing apparatus to perform a method according to an embodiment and data for a method according to an embodiment, a communication unit for performing wired or wireless communication with a graphic processing apparatus, and a controller transmitting the program to the graphic processing apparatus automatically or as requested by the graphic processing apparatus.

A method according to embodiments of the disclosure may be provided as a computer program product.

Such computer program products may include software (S/W) programs or computer-readable storage media storing the S/W programs or products traded between the seller and the buyer.

For example, the computer program products may include S/W program-type products (e.g., downloadable applications (apps)) that are electronically distributed through the device 10 or the manufacturer of the device 10 or electronic market. For electronic distribution, at least part of the S/W programs may be stored in storage media or temporarily generated. In this case, the storage media may be storage media of the manufacturer's or electronic market's server or the relay server.

The embodiments herein are provided merely for better understanding of the disclosure, and the disclosure should not be limited thereto or thereby. The embodiments set forth herein are merely examples, and it will be apparent to one of ordinary skill in the art that various changes may be made thereto without departing from the scope of the disclosure. The scope of the disclosure should be defined by the following claims.

What is claimed is:

1. A method performed by a managing server, the method comprising:

using one or more processors to perform:

receiving, from an electronic device, operation data of the electronic device;

identifying, by using artificial intelligence (AI), a device usage pattern of the electronic device;

identifying, by using the AI, information related to a failure or an abnormal operation of the electronic device and a solution to the failure or the abnormal operation based on the device usage pattern and the operation data received from the electronic device; and transmitting, to a user terminal, the information related to the failure or the abnormal operation of the electronic device and the solution to the failure or the abnormal operation for informing an operator at the user terminal how to repair the failure or the abnormal operation, and wherein the operation data includes at least one of a data of a predetermined data type, a time when the operation data is generated, or identifier information for identifying the electronic device.

2. The method of claim 1, further comprising:

receiving historic information of the electronic device, the historic information comprising at least one information from among a failure history, a failure repair history, a customer profile, an operation history, and information indicating an installation environment for the electronic device; and generating the solution configured to address the failure by reflecting the at least one information to an existing diagnosis treatment solution stored in a memory of the managing server and applicable to treat the failure of the electronic device.

3. The method of claim 1, wherein the operation data includes a numerical data, wherein the operation data is identified based on at least one of a normal range of the numerical data, at least one statistical value, a time interval indicated by a numerical value within a particular range, a variation trend during a time period, a ratio indicated by the numerical value within the particular range, or a degree of similarity with a predetermined abnormal data pattern, and wherein the operation data further includes information related to a degree of risk determined by the numerical data.

4. The method of claim 1, wherein the operation data includes at least one from among a discrete data, a nominal data, and an ordinal data, and wherein the operation data is identified based on at least one of a frequency of occurrence of a particular value within a particular period, an interval of occurrence of the particular value, a number of times of occurrence of the particular value, or a degree of similarity with a predetermined data pattern.

5. The method of claim 1, wherein the operation data includes a first data and a second data having a different data type from the first data, and wherein the operation data is detected based on a value of the second data being outside a range determined by the first data.

6. The method of claim 1, wherein the solution to the failure or the abnormal operation includes replacing a part of the electronic device.

7. A managing server comprising:

a communication module; and a processor configured to:

control the communication module to receive, from an electronic device, operation data of the electronic device, identify, by using artificial intelligence (AI), a device usage pattern of the electronic device, identify, by using the AI, information related to a failure or an abnormal operation of the electronic device and a solution to the failure or the abnormal operation based on the device usage pattern and the operation data received from the electronic device, and control the communication module to transmit, to a user terminal, information related to the failure or the abnormal operation of the electronic device and the solution to the failure or the abnormal operation for informing an operator at the user terminal how to repair the failure or the abnormal operation, wherein the operation data includes at least one of a data of a predetermined data type, a time when the operation data is generated, or identifier information for identifying the electronic device.

8. The managing server of claim 7, wherein the processor is further configured to:

receive historic information of the electronic device, the historic information comprising at least one information from among a failure history, a failure repair history, a customer profile, an operation history, and information indicating an installation environment for the electronic device; and generate the solution configured to address the failure by reflecting the at least one information to an existing diagnosis treatment solution stored in a memory of the managing server and applicable to treat the failure of the electronic device.

9. The managing server of claim 7, wherein the operation data includes at least one of a data of a predetermined data type, a time when the operation data is generated, or identifier information for identifying the electronic device.

10. The managing server of claim 7, wherein the operation data includes a numerical data, wherein the operation data is determined based on at least one of a normal range of the numerical data, at least one statistical value, a time interval indicated by a numerical value within a particular range, a variation trend during a time period, a ratio indicated by the numerical value within the particular range, or a degree of similarity with a predetermined abnormal data pattern, and wherein the operation data further includes information related to a degree of risk determined by the numerical data.

11. The managing server of claim 7, wherein the operation data includes at least one from among a discrete data, a nominal data, and an ordinal data, and wherein the operation data is identified based on at least one of a frequency of occurrence of a particular value within a particular period, an interval of occurrence of the particular value, a number of times of occurrence of the particular value, or a degree of similarity with a predetermined data pattern.

12. The managing server of claim 7, wherein the operation data includes a first data and a second data having a different data type from the first data, and wherein the operation data is detected based on a value of the second data being outside a range determined by the first data.

13. The managing server of claim 7, wherein the solution to the failure or the abnormal operation includes replacing a part of the electronic device.

14. An electronic device comprising:

a communication module; and a processor configured to:

control the communication module to receive, from a managing server, information related to a data pattern detection routine to identify abnormal data of the electronic device, among an operation data of the electronic device, the operation data including a sensor data and an operation history of the electronic device, wherein the information related to the data pattern detection routine includes at least one data pattern, identify, among the operation data, the abnormal data based on the at least one data pattern, the abnormal data including at least one from among the sensor data and the operation history that are identified as abnormal, identify, by the electronic device, a degree of risk associated with the abnormal data based on information included in the data pattern detection routine, and control the communication module to transmit, to the managing server, the identified abnormal data and information on the degree of risk associated with the identified abnormal data, receive, from the managing server via the communication module, a solution to a failure or an abnormal operation of the electronic device for informing an operator at the electronic device how to repair the failure or the abnormal operation;

wherein the abnormal data includes at least one of a data of a predetermined data type, a time when the abnormal data is generated, or identifier information for identifying the electronic device.

15. The electronic device of claim 14, further comprising a memory, wherein the processor is further configured to:

perform at least one from among storing normal data in the memory and transmitting the normal data to the managing server based on receiving a request signal for the normal data from the managing server.

16. The electronic device of claim 14, wherein the abnormal data includes a numerical data, wherein the abnormal data is determined based on at least one of a normal range of the numerical data, at least one statistical value, a time interval indicated by a numerical value within a particular range, a variation trend during a time period, a ratio indicated by the numerical value within the particular range, or a degree of similarity with at least one normal data pattern, and wherein the degree of risk is determined by the numerical data based on the information included in the data pattern detection routine.

17. The electronic device of claim 14, wherein the abnormal data includes data of a predetermined data type including at least one from among a discrete data, a nominal data, and an ordinal data, and wherein the abnormal data is identified based on at least one of a frequency of occurrence of a particular value within a particular period, an interval of occurrence of the particular value, a number of times of occurrence of the particular value, or a degree of similarity with at least one normal data pattern.

18. The electronic device of claim 14, wherein the abnormal data includes a first data and a second data having a different data type from the first data, and wherein the abnormal data is detected based on a value of the second data is outside a range determined by the first data.

* * * * *